United States Patent
Zelig et al.

(10) Patent No.: US 7,974,223 B2
(45) Date of Patent: Jul. 5, 2011

(54) VIRTUAL PRIVATE LAN SERVICE OVER RING NETWORKS

(75) Inventors: David Zelig, Givatayim (IL); Leon Bruckman, Petah Tikva (IL); Ronen Solomon, Givatayim (IL); Uzi Khill, Netanya (IL); Gal Mor, Herzliya (IL)

(73) Assignee: Corrigent Systems Ltd., Tel Aviv (IL)

( * ) Notice: Subject to any disclaimer, the term of this patent is extended or adjusted under 35 U.S.C. 154(b) by 1276 days.

(21) Appl. No.: 10/993,882

(22) Filed: Nov. 19, 2004

(65) Prior Publication Data
US 2006/0109802 A1 May 25, 2006

(51) Int. Cl.
*H04L 12/28* (2006.01)
(52) U.S. Cl. ........ 370/258; 370/392; 370/397; 370/399; 370/395.21; 370/395.53; 370/405; 370/409
(58) Field of Classification Search .................. 370/255, 370/392, 397, 399, 395.21, 395.5, 395.53, 370/400, 401, 403, 404, 405, 406, 409
See application file for complete search history.

(56) References Cited

U.S. PATENT DOCUMENTS

| | | |
|---|---|---|
| 4,535,785 A | 8/1985 | Van den Honert et al. |
| 4,602,624 A | 7/1986 | Naples et al. |
| 4,628,942 A | 12/1986 | Sweeney et al. |
| 4,702,254 A | 10/1987 | Zabara |
| 4,867,164 A | 9/1989 | Zabara |
| 5,025,807 A | 6/1991 | Zabara |
| 5,159,595 A | 10/1992 | Flanagan et al. |
| 5,188,104 A | 2/1993 | Wernicke et al. |
| 5,199,430 A | 4/1993 | Fang et al. |
| 5,205,285 A | 4/1993 | Baker |
| 5,263,480 A | 11/1993 | Wernicke et al. |
| 5,282,468 A | 2/1994 | Klepinski |
| 5,299,569 A | 4/1994 | Wernicke et al. |
| 5,307,353 A | 4/1994 | Yamashita et al. |
| 5,321,393 A | 6/1994 | Carlton et al. |
| 5,335,657 A | 8/1994 | Terry et al. |
| 5,442,134 A | 8/1995 | Miyazaki et al. |
| 5,461,611 A | 10/1995 | Drake et al. |
| 5,540,730 A | 7/1996 | Terry et al. |
| 5,571,150 A | 11/1996 | Wernicke et al. |
| 5,581,703 A | 12/1996 | Baugher et al. |
| 5,596,569 A | 1/1997 | Madonna et al. |
| 5,638,358 A | 6/1997 | Hagi |
| 5,706,516 A | 1/1998 | Chang et al. |
| 5,707,400 A | 1/1998 | Terry et al. |

(Continued)

OTHER PUBLICATIONS

Office Action dated Sep. 29, 2006 for U.S. Appl. No. 10/211,066.

(Continued)

*Primary Examiner* — Jayanti K Patel
*Assistant Examiner* — Bo Hui A. Zhu
(74) *Attorney, Agent, or Firm* — Peter A. Nieves; Sheehan Phinney Bass + Green, PA

(57) ABSTRACT

A method for communication via a ring network that includes a plurality of nodes. The method includes receiving at a first node in the ring network a data packet transmitted over a virtual private LAN service (VPLS), the data packet including an identification of the VPLS. The first node reads the identification from the data packet. Responsively to reading the identification, the first node forwards the data packet to at least one second node in the ring network that is associated with the VPLS.

81 Claims, 9 Drawing Sheets

U.S. PATENT DOCUMENTS

| | | | |
|---|---|---|---|
| 5,755,750 A | 5/1998 | Petruska et al. | |
| 5,925,137 A | 7/1999 | Okanoue et al. | |
| 5,983,360 A | 11/1999 | Ugajin | |
| 6,021,263 A | 2/2000 | Kujoory et al. | |
| 6,032,194 A | 2/2000 | Gai et al. | |
| 6,041,166 A | 3/2000 | Hart et al. | |
| 6,147,993 A | 11/2000 | Kloth et al. | |
| 6,151,297 A | 11/2000 | Congdon et al. | |
| 6,205,359 B1 | 3/2001 | Boveja | |
| 6,205,488 B1 | 3/2001 | Casey et al. | |
| 6,233,073 B1 | 5/2001 | Bowers et al. | |
| 6,246,667 B1 | 6/2001 | Ballintine et al. | |
| 6,256,292 B1 | 7/2001 | Ellis et al. | |
| 6,262,976 B1 | 7/2001 | McNamara | |
| 6,275,493 B1 | 8/2001 | Morris et al. | |
| 6,304,575 B1 | 10/2001 | Carroll et al. | |
| 6,314,110 B1 | 11/2001 | Chin et al. | |
| 6,330,229 B1 | 12/2001 | Jain et al. | |
| 6,339,488 B1 | 1/2002 | Beshai et al. | |
| 6,339,595 B1 | 1/2002 | Rekhter et al. | |
| 6,359,858 B1 | 3/2002 | Smith et al. | |
| 6,366,556 B1 | 4/2002 | Ballintine et al. | |
| 6,370,121 B1 | 4/2002 | Hausman | |
| 6,400,681 B1 | 6/2002 | Bertin et al. | |
| 6,408,001 B1 | 6/2002 | Chuah et al. | |
| 6,446,131 B1 | 9/2002 | Khansari et al. | |
| 6,456,407 B1 | 9/2002 | Tammela et al. | |
| 6,456,587 B2 | 9/2002 | Taniguchi | |
| 6,466,985 B1 | 10/2002 | Goyal et al. | |
| 6,507,577 B1 | 1/2003 | Mauger et al. | |
| 6,510,141 B1 | 1/2003 | Ramfelt et al. | |
| 6,522,627 B1 | 2/2003 | Mauger | |
| 6,553,029 B1 | 4/2003 | Alexander | |
| 6,563,793 B1 | 5/2003 | Golden et al. | |
| 6,584,535 B1 | 6/2003 | Ouellet et al. | |
| 6,604,136 B1 | 8/2003 | Chang et al. | |
| 6,628,624 B1 | 9/2003 | Mahajan et al. | |
| 6,636,478 B1 | 10/2003 | Sensel et al. | |
| 6,639,893 B1 | 10/2003 | Chikenji et al. | |
| 6,639,896 B1 | 10/2003 | Goode et al. | |
| 6,647,008 B1 | 11/2003 | Galand et al. | |
| 6,665,273 B1 | 12/2003 | Goguen et al. | |
| 6,678,241 B1 | 1/2004 | Gai et al. | |
| 6,680,906 B1 | 1/2004 | Nguyen | |
| 6,680,912 B1 | 1/2004 | Kalman et al. | |
| 6,711,125 B1 | 3/2004 | Walrand et al. | |
| 6,724,880 B1 | 4/2004 | Lynch | |
| 6,731,597 B1 | 5/2004 | Batchellor et al. | |
| 6,735,198 B1 | 5/2004 | Edsall et al. | |
| 6,741,553 B1 | 5/2004 | Grenier | |
| 6,757,286 B1 | 6/2004 | Stone | |
| 6,760,775 B1 | 7/2004 | Anerousis et al. | |
| 6,765,921 B1 | 7/2004 | Stacey et al. | |
| 6,778,494 B1 | 8/2004 | Mauger | |
| 6,778,496 B1 | 8/2004 | Meempat et al. | |
| 6,788,681 B1 | 9/2004 | Hurren et al. | |
| 6,795,394 B1 | 9/2004 | Swinkels et al. | |
| 6,801,506 B1 | 10/2004 | Dey | |
| 6,807,172 B1 | 10/2004 | Levenson et al. | |
| 6,820,210 B1 | 11/2004 | Daruwalla et al. | |
| 6,826,158 B2 | 11/2004 | Seaman et al. | |
| 6,829,651 B1 | 12/2004 | Bass et al. | |
| 6,831,932 B1 | 12/2004 | Boyle et al. | |
| 6,879,559 B1 | 4/2005 | Blackmon et al. | |
| 6,879,594 B1 | 4/2005 | Lee et al. | |
| 6,886,043 B1 | 4/2005 | Mauger et al. | |
| 6,922,394 B2 | 7/2005 | Kajiwara | |
| 6,925,054 B1 | 8/2005 | Atterton et al. | |
| 6,934,259 B2 | 8/2005 | Klincewicz et al. | |
| 6,952,397 B2 | 10/2005 | Mor et al. | |
| 6,985,447 B2 | 1/2006 | Gibson et al. | |
| 6,992,975 B1 | 1/2006 | Daniel et al. | |
| 7,009,974 B1 | 3/2006 | Fotedar | |
| 7,035,279 B2* | 4/2006 | Bruckman | 370/460 |
| 7,042,846 B2 | 5/2006 | Bauer | |
| 7,161,899 B2 | 1/2007 | Limaye et al. | |
| 7,212,490 B1 | 5/2007 | Kao et al. | |
| 7,260,097 B2 | 8/2007 | Casey | |
| 2001/0022786 A1 | 9/2001 | King et al. | |
| 2001/0033575 A1 | 10/2001 | Simamura et al. | |
| 2002/0015411 A1 | 2/2002 | Kataoka et al. | |
| 2002/0018482 A1 | 2/2002 | Gotzer | |
| 2002/0024974 A1* | 2/2002 | Karagiannis et al. | 370/516 |
| 2002/0093949 A1 | 7/2002 | Yasu et al. | |
| 2002/0118570 A1* | 8/2002 | Bruckman | 370/460 |
| 2002/0176371 A1* | 11/2002 | Behzadi | 370/254 |
| 2002/0176450 A1 | 11/2002 | Kong et al. | |
| 2002/0179720 A1 | 12/2002 | Liva et al. | |
| 2003/0002443 A1 | 1/2003 | Basso et al. | |
| 2003/0009594 A1* | 1/2003 | McElligott | 709/245 |
| 2003/0012202 A1 | 1/2003 | Fukotomi | |
| 2003/0021226 A1 | 1/2003 | Mor | |
| 2003/0026298 A1 | 2/2003 | Bisson et al. | |
| 2003/0061338 A1 | 3/2003 | Stelliga | |
| 2003/0074469 A1* | 4/2003 | Busi et al. | 709/238 |
| 2003/0088698 A1 | 5/2003 | Singh et al. | |
| 2003/0147344 A1 | 8/2003 | Stewart et al. | |
| 2003/0147345 A1* | 8/2003 | Takagi et al. | 370/222 |
| 2003/0154315 A1* | 8/2003 | Sultan et al. | 709/251 |
| 2003/0189898 A1 | 10/2003 | Frick et al. | |
| 2003/0196135 A1 | 10/2003 | Gottlieb | |
| 2004/0022268 A1* | 2/2004 | Busi et al. | 370/469 |
| 2004/0028058 A1* | 2/2004 | Katoh | 370/395.53 |
| 2004/0071089 A1 | 4/2004 | Bauer et al. | |
| 2004/0101303 A1 | 5/2004 | Williams | |
| 2004/0107285 A1 | 6/2004 | Larson et al. | |
| 2004/0156313 A1 | 8/2004 | Hofmeister et al. | |
| 2004/0170184 A1* | 9/2004 | Hashimoto | 370/401 |
| 2004/0179472 A1 | 9/2004 | Khalilzadeh et al. | |
| 2004/0202171 A1 | 10/2004 | Hama | |
| 2004/0228278 A1 | 11/2004 | Bruckman et al. | |
| 2005/0135436 A1 | 6/2005 | Nigam et al. | |
| 2005/0160171 A1 | 7/2005 | Rabie et al. | |
| 2005/0226265 A1* | 10/2005 | Takatori | 370/452 |
| 2005/0271035 A1* | 12/2005 | Cohen et al. | 370/351 |

OTHER PUBLICATIONS

U.S. Appl. No. 10/054,845, Office Action, Nov. 28, 2005, 12 pages.

Office Action U.S. Appl. No. 10/061,721.

Office Action dated Jan. 23, 2006 for U.S. Appl. No. 10/057,332.

U.S. Appl. No. 10/211,066, Office Action dated Mar. 1, 2007.

Office Action dated Mar. 15, 2006 for U.S. Appl. No. 09/935,970.

Office Action, U.S. Appl. No. 10/369,953, 25 pages, Sep. 11, 2007.

Tsiang et al., in Request for Comments (RFC) 2892 of the Internet Engineering Task Force (IETF).

Martini et al., in an IETF Draft Entitled: "Encapsulation Methods for Transport of layer 2 Frames over MPLS," May 2001. (Available at: serach.ietf.org.internet-drats/draft-martini-12circuit-encap-mpls-02.tst).

Rosen et al., RFC 3031 of the IETF, entitled: "Multiprotocol Label Switching Architecture," Jan. 2001. (Available at: www.ietf.org/rfc.html).

Rosen et al., Request for Comments (RFC) 3032 of the Internet Engineering Task Force (IETF), "MPLS Label Stack Encoding," Jan. 2001.

Awduche, et al., "Requirement for Traffic Engineering Over MPLS," published as IETF RFC 2702, Sep. 1999.

Deering, RFC 1112, "Host Extensions for IP Multicasting," Aug. 1989.

Lasserre et al., in "Virtual Private LAN Services over MPLS," (IETFdraft-lassere-vkompella-ppvpn-vpls-02.txt, Jun. 2002 and Jan. 2003.

Simpson, en IETF RFC 1661, "The Point-to-Point Protocol (PPP)," Jul. 1994.

Baker, et al., in IETF RFC 1638, "PPP Bridging Control Protocol (BCP)," Jun. 1994.

Bradley, et al., in IETF RFC 1490, "Multiprotocol Interconnect over Frame Relay," Jul. 1993.
Komplla, et al., "Virtual Private LAN Service," IETF draft-ietf-12vpn-vpls-gbp-02.tst, May 2003.
IEEE standard 802.17, "Part 17: Resilient Packet Ring (RPR_Access Method & Physical Layer Specifications," RPR Alliance 2002, 2003.

"Star Network" "Star Topology" "Mesh Network," Microsoft Computer Dictionary (Fifth Edition), 2002, Microsoft Press.
Null, Linda, The Essentials of Computer Organization and Architecture 2003, Jones and Barlett Computer Science, p. 536.

* cited by examiner

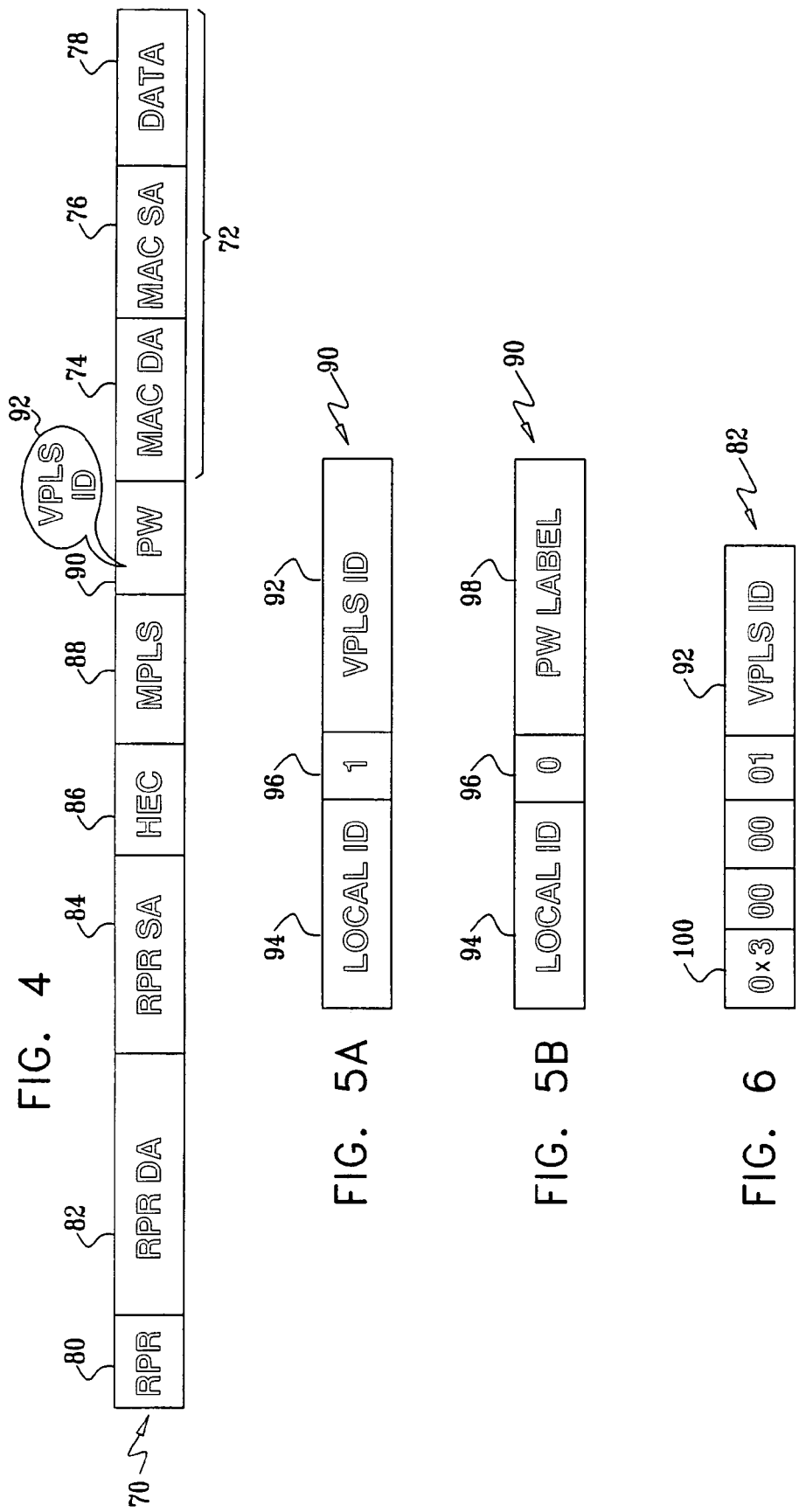

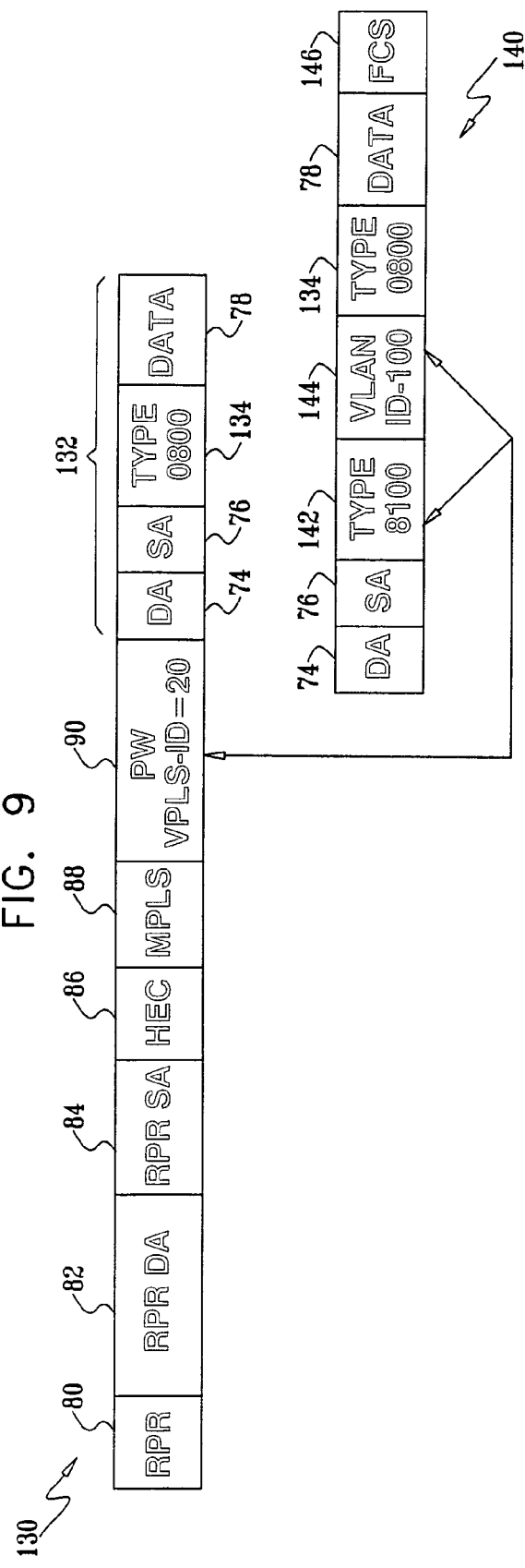
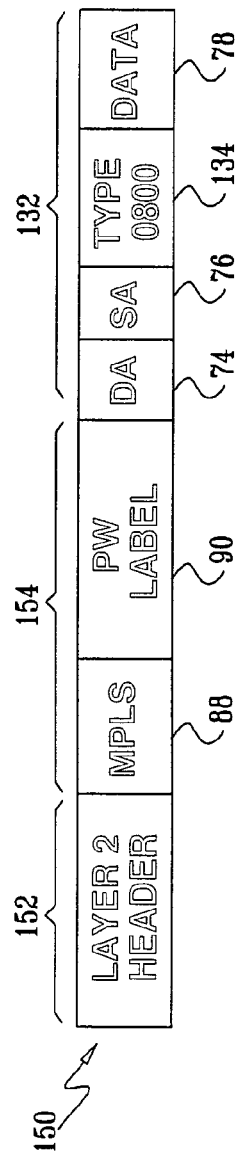
FIG. 9
FIG. 10

VIRTUAL PRIVATE LAN SERVICE OVER RING NETWORKS

FIELD OF THE INVENTION

The present invention relates generally to communication networks, and specifically to methods and systems for providing virtual private LAN services (VPLS).

BACKGROUND OF THE INVENTION

Local Area Networks (LANs) connect computing systems together at the Layer 2 level. The term "Layer 2" refers to the second layer in the protocol stack defined by the well-known Open Systems Interface (OSI) model, also known as the logical link, data link, or Media Access Control (MAC) layer. Each computing system connects to a LAN through a (MAC) device. Multiple LANs can be connected together using MAC bridges, as set forth in the "IEEE Standard for Information Technology, Telecommunications and Information Exchange between Systems, Local and Metropolitan Area Networks, Common Specifications, Part 3: Media Access Control (MAC) Bridges," published as ANSI/IEEE Standard 802.1D (1998), which is incorporated herein by reference. (The 802.1D standard, as well as other IEEE standards cited herein, is available in the standards section of the IEEE Web site.) MAC bridges that implement the 802.1D standard allow MAC devices attached to physically separated LANs to appear to each other as if they were attached to a single LAN. The bridge includes two or more MAC devices that interconnect the bridge ports to respective LANs.

MAC bridges maintain a database to map destination MAC addresses of the packets they receive to bridge ports. The bridge builds the database by means of a learning process, in which it associates the source MAC address of each incoming packet with the port on which the packet was received. When the bridge receives an incoming packet whose destination address is not located in the database, it broadcasts the packet through all its available ports, except the one through which the packet arrived. Other MAC bridges that do not recognize the destination address will further broadcast the packet. Through the broadcast mechanism, the packet will eventually traverse all interconnected bridges at least once, and will ultimately reach its destination. A similar broadcast operation is performed independently for each packet having a destination MAC address of a broadcast or multicast group, although the multicast scope may be reduced if the bridge is aware (by use of special protocols) of the physical locations of the target addresses in each multicast group. The operation of broadcast or multicast of a packet is referred to as a flooding process (irrespective of the reason for the operation).

Recently, various means have been proposed and developed for transporting Layer-2 packets, such as Ethernet frames, over high-speed, high-performance Layer-3 packet networks. Methods for this purpose are described, for example, by Martini et al., in "Encapsulation Methods for Transport of Ethernet Frames Over IP/MPLS Networks" (IETF draft-ietf-pwe3-ethernet-encap-07.txt, May, 2004), which is incorporated herein by reference. This draft defines mechanisms for encapsulating Ethernet traffic for transportation over Internet Protocol (IP) networks using Multi-Protocol Label Switching (MPLS) or other tunneling methods, such as Generic Routing Encapsulation (GRE), as are known in the art. This draft, as well as other Internet drafts cited herein, is available from the Internet Engineering Task Force (IETF) at www.ietf.org/internet-drafts.

According to the model proposed by Martini et al., native Ethernet LANs are connected to the IP network by provider edge (PE) devices, which are linked one to another by tunnels through the IP network. The sending (ingress) PE device receives Ethernet frames from a customer edge (CE) device on the source LAN. It encapsulates the frames in packets with the label stack required for transmitting the packets through the appropriate tunnel to the receiving (egress) PE device. The label structure includes a "Pseudo Wire" label (or PW label), which is used by the egress PE device to de-encapsulate the frame and send it to the proper user port. As a result of this encapsulation and associated processing functions, the IP network emulates Ethernet trunking and switching behavior and can thus be treated as an Ethernet PW. In other words, from the point of view of native Ethernet LANs that are connected to tunnels through the IP network, each PW is a virtual Ethernet point-to-point connection, emulating a physical connection between two Ethernet ports. Martini's encapsulation method may also be used in conjunction with virtual LANs (VLANs), as defined in IEEE standard 802.1Q. In this case, the egress PE device processes and forwards the packet based on the VLAN tag.

Taking this functionality a step further, a number of authors have described methods for creating a virtual private LAN service (VPLS), which links different LANs together over an IP network. Such methods are described, for example, by Kompella et al., in "Virtual Private LAN Service" (IETF draft-ietf-l2vpn-vpls-bgp-02.txt, May, 2004) and by Lasserre et al., in "Virtual Private LAN Services over MPLS" (IETF draft-ietf-l2vpn-vpls-ldp-03.txt, April, 2004), which are incorporated herein by reference.

A VPLS (also known as a transparent LAN service—TLS) provides bridge-like functionality between multiple sites over a large network. Users connect to the VPLS via regular Ethernet interfaces. PWs between the nodes to which the users are connected form the VPLS entity itself. Every node in a VPLS acts as a virtual bridge. A virtual bridge node has "virtual ports," which are the endpoints of PWs that are part of the VPLS. The interfaces to which the users are actually connected are physical ports at the network edges. Both virtual and real interfaces are treated identically from the point of view of frame forwarding and address learning. A single provider node can participate in multiple VPLS instances, each belonging to a different user. From the perspective of the end-user, the VPLS network is transparent. The user is provided with the illusion that the provider network is a single LAN domain. User nodes on different physical LANs can thus be joined together through VPLS connections to define a virtual private network (VPN), which appears to the users to be a single Ethernet LAN.

"Hierarchical VPLS" is an extension to the VPLS model, which is also described by Lasserre et al. in the above-mentioned draft. To avoid loops in the VPN, Lasserre et al. require that each PE be directly connected to every other PE in the same VPN by a single PW, thus defining a full mesh topology. All PEs support a "split horizon" scheme, meaning that a PE must not forward traffic from one PW to another, although it may (and should) forward traffic from one physical port to another and between physical ports and the PWs. In hierarchical VPLS, some or all of the physical interfaces on one side of the split horizon can be replaced by point-to-point PWs, which act as logical extensions of physical ports of remote nodes. In this case, there are both full mesh PWs and point-to-point PWs (and possibly even physical ports) associated with the same VPN. Nodes with only point-to-point PWs are considered to be on the "access side" of the network, and are referred to as "edge nodes." Nodes with full mesh PWs are considered to be in the "core side" of the network, and are referred to as "core nodes."

Bi-directional network ring topologies are gaining in popularity, particularly in Internet Protocol (IP) networks. Such networks provide efficient bandwidth utilization by enabling data to be transferred between any pair of nodes in either direction around the ring, while maintaining fast protection against faults. The two opposing traffic directions are commonly referred to as an inner ringlet and an outer ringlet, or ringlet 0 and ringlet 1. It will be understood, however, that in the context of the present patent application and in the claims, the terms "inner" and "outer," as well as other terms such as "east" and "west" or "right" and "left," are used arbitrarily to distinguish between the two opposing directions of packet flow in a ring network. These terms are chosen solely for convenience of explanation, and do not necessarily bear any relation to the physical characteristics of the network.

The leading bi-directional protocol for high-speed packet rings is the Resilient Packet Ring (RPR) protocol, which has recently been approved as IEEE standard 802.17, "Part 17: Resilient Packet Ring (RPR) Access Method & Physical Layer Specifications," which is incorporated herein by reference. Using the RPR protocol, each node (commonly referred to as a "station") in a ring network has a RPR MAC address and can communicate directly with all other nodes through either ringlet. Each packet sent over either of the ringlets carries a header indicating its RPR MAC destination address. The receiving node recognizes its address in the header and strips the packet from the ring. All other nodes pass the packet onward transparently around the ring. Multicast and broadcast packets may also be delivered over the rings in a similar fashion, using a suitable multicast or broadcast address.

The RPR standard (Annex E) also defines a mechanism for bridging between 802.1D and 802.1Q LANs via the ring network. Bridging of this sort is carried out by bridge nodes on the ring, which connect the ring to other LANs. When a bridge node receives a packet from another LAN, it adds a RPR header with an appropriate RPR MAC destination address and forwards the packet across the ring. If the particular RPR MAC address for the packet is unknown, the bridge node uses a broadcast MAC address to flood the packet to all the nodes on the ring.

Busi et al. describe methods for making transparent LAN connections over a RPR network in U.S. Patent Application Publications US 2003/0074469 A1 and US 2004/0022268 A1, whose disclosures are incorporated herein by reference. The first of these publications describes a method for setting up a transparent LAN-to-LAN functionality between multi-customer source locations through a RPR network. To transport Ethernet frames across the RPR network, an auxiliary header and RPR header are added to the Ethernet frame. The auxiliary header comprises information about the channel designed to transport the frame. The second publication describes a method for making an end-to-end connection between RPR and MPLS networks, wherein the RPR network is linked to the MPLS network through a TLS layer.

SUMMARY OF THE INVENTION

Embodiments of the present invention provide methods and devices for enhancing the efficiency and functionality of virtual private LAN service (VPLS) over a ring network, such as a RPR network. In these embodiments, the MAC processing layer of the ring network nodes is made aware of the VPLS association of packets that are transmitted through the ring network. For this purpose, for example, the RPR destination address field may include a VPLS identifier, which the MAC processor of the RPR nodes is programmed to recognize and filter. The ring network nodes are able to use this information in order to forward to each local node only packets for those VPLS instances that are served by the local node, thus using the node resources more efficiently. Multiple, different VPLS instances may operate simultaneously over the ring network in this manner.

In some embodiments of the present invention, when a node in the ring network receives a VPLS packet for which the ring network MAC destination address is unknown, it does not flood the packet to all the nodes on the ring. Rather, it forwards copies of the packet only to the specific destination nodes that serve the VPLS instance to which the packet belongs. Typically, each copy of the packet is sent on the ringlet that will give the shortest path to the destination node or nodes that are to receive it. A time-to-live (TTL) field in the ring protocol packet header may be set so that the packet reaches only the most distant destination node on each ringlet, and proceeds no farther. These mechanisms can substantially reduce the bandwidth used by the ring in supporting the VPLS, since they replace the gross flooding methods that are known in the art with selective packet forwarding. In other words, VPLS packets whose MAC destination address is unknown need not be flooded over all spans of the ring and processed by all the nodes, but are rather sent selectively to the nodes participating in the particular VPLS and are processed by those nodes.

Typically, the ring network comprises bridge nodes, which link the ring network to one or more other networks to which user nodes are connected. The term "bridge" is used broadly in the context of the present patent application and in the claims to refer to nodes that link the ring network to other packet networks. This sort of bridging includes not only the sort of MAC bridge functionality that is defined in the IEEE 802.1 family of standards, but also other sorts of network linking functions, as are known in the art.

User nodes have their own MAC addresses, such as Ethernet MAC addresses, separate and apart from the system of ring network MAC addresses that are assigned to the nodes on the ring. The bridge nodes learn the MAC addresses of the user nodes participating in each VPLS instance and store these addresses in a MAC table. The table indicates, for each user MAC address and VPLS instance, the ring network MAC address of the destination bridge node through which packets to this address are to be transmitted. The table entries may also include an identification of the ringlet to be used for transmission to the destination bridge node on the ring serving the user MAC address in question (typically the ringlet that provides the shortest path to the destination bridge node). The ringlet identification for each user MAC address may be learned automatically by the ring nodes or it may alternatively be provided by other means, such as manual configuration, and/or stored in a separate table. In any case, when a bridge node receives a packet for transmission to a known user MAC address on a given VPLS instance, it forwards the packet by unicast to the appropriate destination bridge node via the ringlet indicated in the table. Mechanisms are provided for adjusting VPLS transmissions of this sort in the event of a failure on one of the spans of the ring.

In another aspect of the invention, VPLS topology associated with the ring network nodes is also used in determining whether to admit a new connection on the ring network. The decision depends on the availability of sufficient bandwidth to accommodate upstream traffic from the new connection on the links of the ring, as well as the availability of bandwidth to accommodate downstream traffic to be generated by the new connection through the nodes serving the VPLS instance in question. The use of VPLS topology in assessing and allocating bandwidth on the ring network permit the network resources to be used efficiently, in a way that reflects more accurately the actual patterns of traffic that are expected on the ring.

In some embodiments of the present invention, the enhanced VPLS functionality described above is extended over multiple, interconnected ring networks. For this purpose, certain bridge nodes on the different rings may be linked by a pseudo-wire (PW) over a tunnel through another packet network. In these embodiments, the VPLS identifier used in the ring network is mapped to a point-to-point PW label (as defined in the above-mentioned draft by Martini, for example). This PW can thus be associated with a VPLS instance on the other ring for multi-ring VPLS connectivity. Alternatively, a PW may be used to connect a single remote Ethernet port to the VPLS instance, or to connect the VPLS instance on the ring to a hierarchical VPLS. (In the latter case, the entire VPLS instance on the ring is viewed by the hierarchical VPLS network as a single spoke network.) Alternatively, the ring interconnection may be achieved by mapping the VPLS identifier used in the ring network to a static VLAN trunking tag, and sending VPLS packets over an Ethernet interface from one ring to the other, where the packets are remapped to the VPLS instance on the other ring.

Although embodiments described hereinbelow make reference specifically to RPR networks, the principles of the present invention are similarly applicable in ring networks of other types. Furthermore, the terms VPLS and PW should be understood to comprise any and all sorts of virtual Layer-2 networks and Layer-2 connections that may be implemented over an underlying packet network, including (but not limited to) IP and other Layer-3 networks.

There is therefore provided, in accordance with an embodiment of the present invention, a method for communication via a ring network that includes a plurality of nodes, the method including:

receiving at a first node in the ring network a data packet transmitted over a virtual private LAN service (VPLS), the data packet including an identification of the VPLS;

reading the identification from the data packet at the first node; and responsively to reading the identification, forwarding the data packet from the first node to at least one second node in the ring network that is associated with the VPLS.

In some embodiments, the data packet includes a pseudo-wire (PW) label, and the PW label includes the identification of the VPLS. The ring network may be configured to support a point-to-point tunneling service, and the PW label may include a flag indicating whether the data packet is associated with the VPLS or with the point-to-point service.

In disclosed embodiments, the ring network operates in accordance with a resilient packet ring (RPR) protocol, and the data packet includes a RPR destination address, which includes the identification of the VPLS. The RPR destination address may be a multicast address, which identifies a set of the nodes of the ring network that serve the VPLS, and forwarding the data packet may include multicasting the data packet to the nodes in the set. Alternatively, forwarding the data packet may include identifying a destination node to which the data packet is directed, and forwarding the data packet by unicast over the ring network to the RPR destination address of one of the nodes in the ring network that serves the destination node. Further alternatively, the RPR destination address may be a broadcast address, and forwarding the data packet may include broadcasting the data packet to the nodes in the ring network.

Typically, receiving the data packet includes receiving the data packet over a span of the ring network, and reading the identification includes filtering the packet using a media access control (MAC) processor at the first node in order to determine whether to copy or forward the data packet. In a disclosed embodiment, filtering the packet includes comparing the VPLS identification to a list of one or more VPLS instances that the first node is assigned to serve, and the method includes copying the data packet from the MAC processor to a network processor of the first node if the VPLS identification matches an entry on the list.

In some embodiments, the first node is a bridge node, and receiving the data packet includes receiving the data packet over a link to the bridge node from a source node outside the ring network, and forwarding the data packet includes converting the data packet to a packet format that is compliant with a ring network protocol and includes a VPLS identifier. In a disclosed embodiment, the ring network protocol includes a resilient packet ring (RPR) protocol, and converting the data packet includes inserting the VPLS identifier in a RPR destination address of the data packet. Additionally or alternatively, receiving the data packet includes reading a destination address of the data packet, and forwarding the data packet includes checking the destination address and the identification of the VPLS against a forwarding table held at the first node, and determining the at least one second node to which the data packet should be forwarded based on the forwarding table. Forwarding the data packet includes, if the forwarding table does not contain an entry corresponding to the destination address and the identification of the VPLS, multicasting the packet to a subset of the nodes of the ring network that are assigned to serve the VPLS.

In other embodiments, the first node includes a bridge node, and the data packet received at the first node includes a destination address outside the ring network, and forwarding the data packet includes checking the destination address and the identification of the VPLS against a forwarding table to determine the at least one second node on the ring network to which the data packet should be forwarded. In one embodiment, the method includes assigning a subset of the nodes of the ring network to serve the VPLS, and forwarding the data packet includes, if the forwarding table does not include an entry corresponding to the destination address and the identification of the VPLS, multicasting the data packet to the subset of the nodes. Typically, multicasting the data packet includes setting a time-to-live (TTL) value of the data packet so that the data packet will reach all the nodes in the subset without traversing at least one span of the ring network. In a disclosed embodiment, setting the TTL value includes determining a minimal number of hops required to reach all the nodes in the subset serving the VPLS, and setting the TTL value to the minimal number. Additionally or alternatively, checking the destination address and the identification of the VPLS includes reading from the forwarding table a direction in which to forward the data packet around the ring to the at least one second node, and forwarding the data packet includes transmitting the data packet around the ring in the direction.

In some embodiments, the VPLS includes at least first and second VPLS instances that are operative on the ring network, and reading the identification includes making a determination that the data packet is associated with the first instance, and forwarding the data packet includes selecting the at least one second node responsively to the determination. First and second subsets of the nodes of the ring network may be assigned to serve, respectively, the first and second instances, and selecting the at least one second node may include choosing one or more of the nodes in the first subset.

In some embodiments, receiving the data packet includes receiving the data packet over a link from outside the ring network in a link packet format, wherein the received data packet includes a first VPLS identifier that identifies the VPLS on the link, and forwarding the data packet includes mapping the first VPLS identifier to a second VPLS identifier, and formatting the data packet for transmission over the ring network in a ring packet format, and inserting the second VPLS identifier in the data packet. The VPLS may be configured to operate on first and second ring networks, which are connected by the link therebetween.

There is also provided, in accordance with an embodiment of the present invention, a method for communication via a ring network that includes a plurality of nodes, the method including:

assigning first and second subsets of the nodes of the ring network to serve, respectively, first and second instances of a virtual private LAN service (VPLS);

receiving at a first node in the first subset a data packet transmitted over the first instance of the VPLS, the data packet including an identification of the first instance; and responsively to the identification, forwarding the data packet selectively from the first node to one or more additional nodes in the first subset.

In a disclosed embodiment, the first node also belongs to the second subset, and the method includes receiving at the first node a further data packet transmitted over the second instance of the VPLS, and forwarding the further data packet selectively from the first node to one or more of the nodes in the second subset that are not in the first subset.

Typically, forwarding the data packet selectively includes multicasting the data packet only to the nodes in the first subset.

In a disclosed embodiment, the data packet includes a pseudo-wire (PW) label, and the PW label includes the identification of the first instance, wherein the first and second instances are assigned different, respective first and second label values.

There is additionally provided, in accordance with an embodiment of the present invention, a method for communication via a ring network that includes a plurality of nodes, the method including:

assigning a subset of the nodes of the ring network to serve a virtual private LAN service (VPLS);

receiving at a bridge node in the ring network a data packet transmitted over the VPLS, the data packet including a destination address outside the ring network;

checking the destination address against a forwarding table to locate a destination node on the ring network to which the data packet should be forwarded; and if the forwarding table does not indicate the destination node corresponding to the destination address of the data packet, multicasting the data packet to the subset of the nodes.

In disclosed embodiment, the method further includes finding an entry in the forwarding table indicating the destination node in the subset of the nodes of the ring network that corresponds to the destination address of the data packet, and unicasting the data packet to the destination node for forwarding over the VPLS to the destination node. Typically, the entry further indicates a direction of transmission on the ring network from the bridge node to the destination node, and unicasting the data packet includes transmitting the data packet in the indicated direction. The bridge node may learn the direction of transmission responsively to one or more previous packets received from the ring network at the bridge node, wherein learning the direction of transmission typically includes finding a shortest path between the bridge node and the destination node. Additionally or alternatively, the method may include discovering a faulty span in the ring network, and changing the direction of transmission indicated in the table so as to steer the data packet to the destination node while avoiding the faulty span.

In a disclosed embodiment, the ring network operates in accordance with a resilient packet ring (RPR) protocol, and multicasting the data packet includes inserting in a header of the packet a multicast RPR destination address corresponding to the VPLS. Typically, the multicast RPR destination address includes a private multicast address, which identifies the subset of the nodes, so that the multicast data packet is not copied by the nodes of the ring network that are outside the subset.

There is further provided, in accordance with an embodiment of the present invention, a method for communication via a ring network that includes a plurality of nodes and spans interconnecting the nodes, the method including:

assigning a subset of the nodes of the ring network to serve a virtual private LAN service (VPLS);

receiving at a first node in the subset a data packet for transmission over the VPLS;

determining a maximal number of the spans that must be traversed by the data packet in order to reach all the nodes in the subset from the first node; and multicasting the data packet from the first node to the nodes in the subset, while setting a time-to-live (TTL) value of the data packet responsively to the maximal number so that the data packet does not traverse at least one of the spans in the ring network.

In some embodiments, the ring network is a bi-directional ring network, and multicasting the data packet includes transmitting first and second copies of the data packet in respective, mutually-opposing first and second directions around the ring network. Typically, setting the TTL value includes setting first and second TTL values, respectively, in the first and second copies of the data packet so as to minimize the number of the spans that will be traversed by the data packet while reaching all the nodes in the subset. In a disclosed embodiment, transmitting the first and second copies includes, upon occurrence of a fault in one of the spans of the network, steering at least one of the first and second copies so as to avoid the fault, and setting the first and second TTL values includes adjusting at least one of the TTL values responsively to the steering.

In a disclosed embodiment, setting the TTL value includes setting the TTL value so that the data packet does not traverse at least two of the spans in the ring network.

There is moreover provided, in accordance with an embodiment of the present invention, a method for communication, including:

defining a virtual private LAN service (VPLS) to operate on first and second ring networks that operate in accordance with a ring network protocol, the first and second ring networks including respective first and second bridge nodes, which are connected by a link therebetween, which operates in accordance with a link protocol;

transmitting a data packet over the VPLS on the first ring network to the first bridge node, the data packet having a first packet format that is compliant with the ring network protocol and including a first VPLS identifier associated with the VPLS;

conveying the data packet from the first bridge node over the link to the second bridge node in a second packet format that is compliant with the link protocol and includes a second VPLS identifier that is associated with the VPLS; and responsively to the second VPLS identifier, determining at the second bridge node that the data packet belongs to the VPLS and transmitting the data packet over the VPLS on the second ring network.

In a disclosed embodiment, transmitting the data packet includes inserting the VPLS identifier in a first pseudo-wire (PW) label of the data packet in the first packet format. Typically, the link protocol includes a point-to-point PW protocol, and the second VPLS identifier includes a second PW label, and conveying the data packet includes mapping the first PW label to the second PW label.

In one embodiment, the link protocol includes a tunneling protocol.

In another embodiment, the link protocol includes a virtual bridge local area network (VLAN) protocol, and the second VPLS identifier includes a VLAN tag.

In a disclosed embodiment, defining the VPLS includes defining a plurality of instances of the VPLS on the first and second ring networks, each of the instances having respective first and second VPLS identifiers associated therewith, and conveying the data packet over the link includes mapping the first VPLS identifier to the respective second VPLS identifier.

In one embodiment, transmitting the data packet over the VPLS on the second ring network includes transmitting the data packet in the first packet format, with the same first VPLS identifier as was included in the data packet on the first ring network. In another embodiment, transmitting the data packet over the VPLS on the second ring network includes transmitting the data packet in the first packet format with a third VPLS identifier, which is different from the first VPLS identifier.

In a disclosed embodiment, defining the VPLS includes defining a hierarchical VPLS.

There is moreover provided, in accordance with an embodiment of the present invention, a method for communication via a network that includes a plurality of nodes in a predefined topology, the method including:

assigning a subset of the nodes of the network to serve a virtual private LAN service (VPLS), the subset defining a VPLS topology within the predefined topology;

receiving a request to admit a new connection on the VPLS;

assessing availability of bandwidth to serve the new connection based on the VPLS topology; and determining whether to admit the new connection responsively to the availability of the bandwidth.

In some embodiments, the predefined topology includes a ring, in which the nodes are interconnected by spans of the ring, and assessing the availability of the bandwidth includes assessing an upstream bandwidth required by the new connection on the spans of the ring and assessing a downstream bandwidth required by the new connection via the nodes in the subset to destinations outside the ring. Typically, assessing the downstream bandwidth includes summing bandwidth requirements of all connections served by each of the nodes in the subset, and verifying that each of the nodes in the subset has sufficient bandwidth available to serve the new connection. In one embodiment, assigning the subset includes assigning at least one of the nodes in the subset to serve a first instance of the VPLS, but not a second instance of the VPLS, and summing the bandwidth requirements includes, for the at least one of the nodes, summing the bandwidth requirements of the connections on the first instance of the VPLS, but not the connections on the second instance of the VPLS.

There is furthermore provided, in accordance with an embodiment of the present invention, apparatus for communication via a ring network that includes a plurality of nodes, the apparatus including:

first and second ring interfaces, which are adapted to couple a first node in the ring network to respective first and second spans of the ring network; and a medium access control (MAC) processor, which is coupled to receive, via the first ring interface, a data packet transmitted over a virtual private LAN service (VPLS), the data packet including an identification of the VPLS, to read the identification from the data packet, and responsively to reading the identification, to forward the data packet via the second ring interface to at least one second node in the ring network that is associated with the VPLS.

In a disclosed embodiment, the MAC processor includes a VPLS filter, which is coupled to process the identification of the VPLS in order to determine whether to copy or forward the data packet. The apparatus may also include a protocol processor, which is coupled to process and forward the data packet to a user node outside the ring network, wherein the VPLS filter is adapted to compare the identification of the VPLS to a list of one or more VPLS instances that the first node is assigned to serve, and to copy the data packet to the protocol processor if the VPLS identification matches an entry on the list.

There is also provided, in accordance with an embodiment of the present invention, apparatus for communication via a ring network that includes a plurality of nodes, the apparatus including:

first and second ring interfaces, which are adapted to couple a first node to respective first and second spans of the ring network;

a bridge, including one or more ports for coupling the first node to one or more user nodes outside the ring network; and processing circuitry, which is adapted to receive via one of the ports a data packet transmitted from a source node over a virtual private LAN service (VPLS), the data packet including an identification of the VPLS, to read the identification from the data packet, and responsively to reading the identification, to forward the data packet via at least one of the ring interfaces to at least one second node in the ring network that is associated with the VPLS.

There is additionally provided, in accordance with an embodiment of the present invention, apparatus for communication via a ring network, the apparatus including a plurality of nodes, linked together in a ring by spans of the ring network, wherein first and second subsets of the nodes of the ring network are assigned to serve, respectively, first and second instances of a virtual private LAN service (VPLS), wherein the nodes are adapted, upon receiving a data packet that includes an identification of one of the first and second instances, to forward the data packet selectively, responsively to the identification, to one or more additional nodes in one of the first and second subsets.

There is further provided, in accordance with an embodiment of the present invention, apparatus for communication via a ring network that includes a plurality of nodes, a subset of which are assigned to serve a virtual private LAN service (VPLS), the apparatus including:

first and second ring interfaces, which are adapted to couple a first node to respective first and second spans of the ring network;

a bridge, including one or more ports for coupling the first node to one or more user nodes outside the ring network; and processing circuitry, which is adapted to receive via one of the ports a data packet transmitted from a source node over the VPLS, the data packet including a destination address outside the ring network, to check the destination address against a forwarding table to locate a destination node on the ring network to which the data packet should be forwarded, and to multicast the data packet to the subset of the nodes if the forwarding table does not indicate the destination node corresponding to the destination address of the data packet.

There is moreover provided, in accordance with an embodiment of the present invention, apparatus for communication via a ring network that includes a plurality of nodes and spans interconnecting the nodes, wherein a subset of the nodes are assigned to serve a virtual private LAN service (VPLS), the apparatus including:

first and second ring interfaces, which are adapted to couple a first node to respective first and second spans of the ring network;

a bridge, including one or more ports for coupling the first node to one or more user nodes outside the ring network; and processing circuitry, which is adapted to receive via one of the ports a data packet for transmission over the VPLS, to determine a maximal number of the spans that must be traversed by the data packet in order to reach all the nodes in the subset from the first node, and to multicast the data packet from the first node to the nodes in the subset, while setting a time-to-live (TTL) value of the data packet responsively to the maximal number so that the data packet does not traverse at least one of the spans in the ring network.

There is furthermore provided, in accordance with an embodiment of the present invention, apparatus for communication, including a plurality of nodes that are mutually interconnected in first and second ring networks that operate in accordance with a ring network protocol, the nodes in the first and second ring networks including respective first and second bridge nodes, which are connected by a link therebetween, which operates in accordance with a link protocol, wherein a virtual private LAN service (VPLS) is configured to operate on the first and second ring networks such that upon transmission of a data packet over the VPLS on the first ring network to the first bridge node, the data packet having a first packet format that is compliant with the ring network protocol and including a first VPLS identifier associated with the VPLS, the first bridge node conveys the data packet over the link to the second bridge node in a second packet format that is compliant with the link protocol and includes a second VPLS identifier that is associated with the VPLS, and such that responsively to the second VPLS identifier, the second bridge node determines that the data packet belongs to the VPLS and transmits the data packet over the VPLS on the second ring network.

There is also provided, in accordance with an embodiment of the present invention, apparatus for communication, including:

a plurality of nodes that are interconnected in a predefined topology, wherein a subset of the nodes are assigned to serve a virtual private LAN service (VPLS), the subset defining a VPLS topology within the predefined topology; and a connection admission controller (CAC), associated with at least one of the nodes, which is adapted to receive a request to admit a new connection on the VPLS, to assess availability of bandwidth to serve the new connection based on the VPLS topology, and to determine whether to admit the new connection responsively to the availability of the bandwidth.

The present invention will be more fully understood from the following detailed description of the embodiments thereof, taken together with the drawings in which:

BRIEF DESCRIPTION OF THE DRAWINGS

FIG. 4 is a block diagram that schematically illustrates a structure of a VPLS packet carried over a RPR network, in accordance with an embodiment of the present invention;

FIG. 5A is a block diagram that schematically illustrates a PW field in a header of a VPLS packet that is transmitted over a ring network, in accordance with an embodiment of the present invention;

FIG. 5B is a block diagram that schematically illustrates a PW field in a header of a point-to-point packet that is transmitted over a ring network, in accordance with an embodiment of the present invention;

FIG. 6 is a block diagram that schematically illustrates a destination address field of a VPLS packet that is transmitted by multicast over a ring network, in accordance with an embodiment of the present invention;

FIG. 9 is a block diagram that schematically illustrates a structure of a VPLS packet carried over a RPR network and over a VLAN trunk connecting the RPR network to another network, in accordance with an embodiment of the present invention;

FIG. 10 is a block diagram that schematically illustrates a structure of a VPLS packet that is carried through a MPLS tunnel, in accordance with an embodiment of the present invention;

DETAILED DESCRIPTION OF EMBODIMENTS

Figure 1:
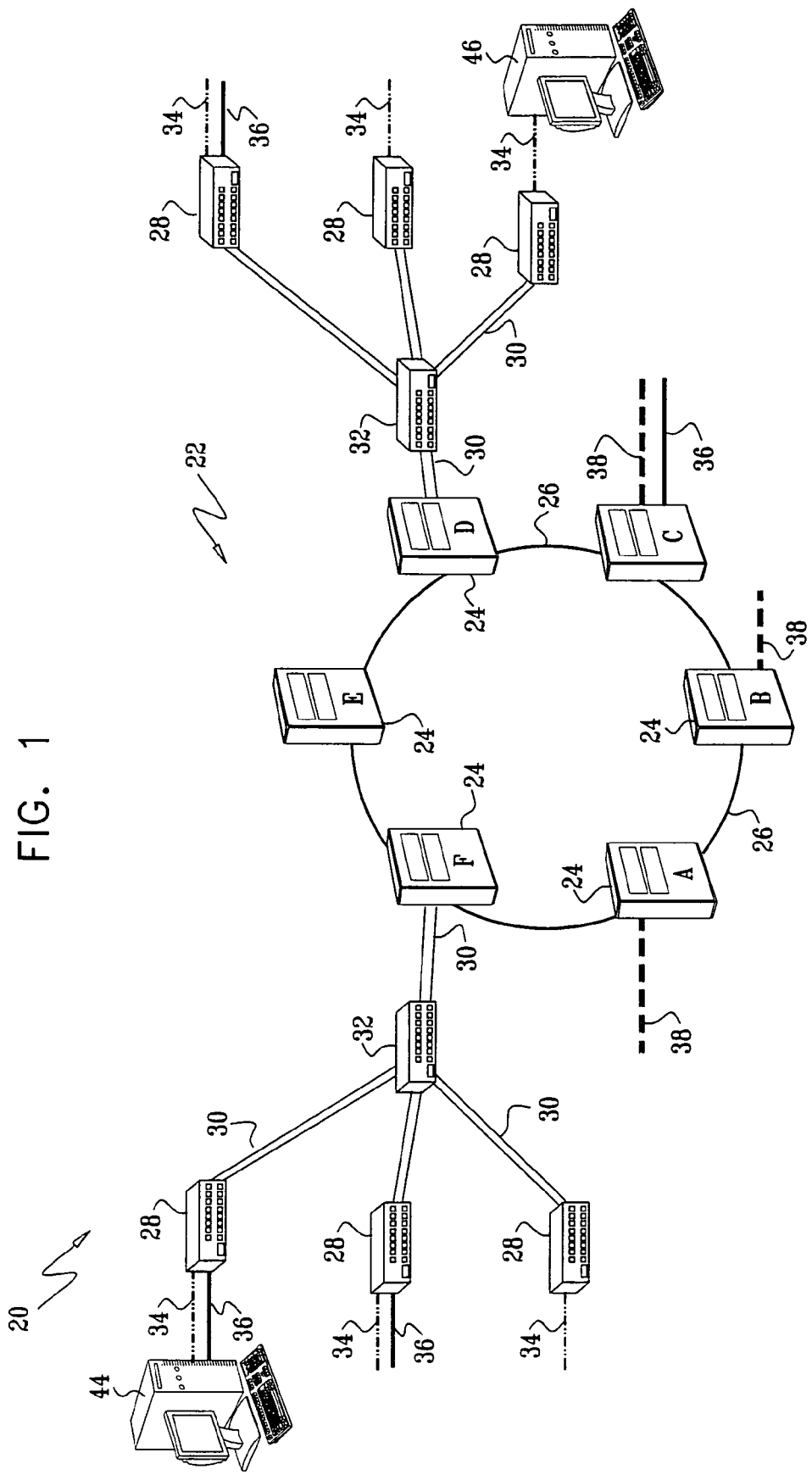
FIG. 1 is a block diagram that schematically illustrates a ring-based communication network, in accordance with an embodiment of the present invention.

FIG. 1 is a block diagram that schematically illustrates a communication network 20, in accordance with an embodiment of the present invention. Network 20 in this example is built around a bi-directional ring network 22, typically a RPR ring, as described above. Although FIG. 1 shows a particular, simple network topology for purposes of illustration, the principles of this embodiment may equally be applied in other, more complex topologies, comprising multiple rings and/or other networks coupled to ring network 22. Aspects of implementation of these principles in more complex topologies are described further hereinbelow.

Network 22 comprises ring nodes 24, or stations, which are linked by spans 26 of the ring. Typically, nodes 24 comprise bridge nodes, which link ring network 22 to other parts of network 20. For example, nodes 24 may be linked by packet trunks 30 to Layer-2 switches 28 and 32, such as Ethernet switches. Trunks 30 may each comprise a single link, or they may comprise multiple links grouped together for increased bandwidth, using methods of link aggregation that are known in the art, for instance. Switches 32 serve as bridges to other LANs (not shown) served by switches 28, to which user nodes may connect to network 20. In some embodiments, as described hereinbelow, switches 32 may be functionally and/or physically integrated with corresponding nodes 24 of ring network 22. Alternatively, if user nodes are connected directly to nodes 24, the corresponding switches 32 may not be required at all.

Network 20 is configured to support multiple VPLS instances on ring network 22, such as instances 34, 36, 38 that are indicated by corresponding lines connecting to certain nodes in network 20. These lines may be thought of as representing links to user nodes (not shown in the figure). As noted earlier, each of the VPLS instances gives users who are connected to it the illusion that they are part of a single bridged LAN, which extends physically over different parts of network 20. Connections of each VPLS instance to the nodes of network 20 may be made either through dedicated physical ports of the switches in the network or through virtual ports, which may share physical ports with other services. In the Ethernet context, for example, each VPLS instance may be associated either with certain Ethernet switch ports or with a particular VLAN. Thus, in FIG. 1, VPLS instances 36 and 38 are defined on physical Ethernet ports of nodes 24 and switches 28, while instance 34 is VLAN-based. Handling of VLAN-based VPLS instances is described in further detail hereinbelow.

Figure 2:
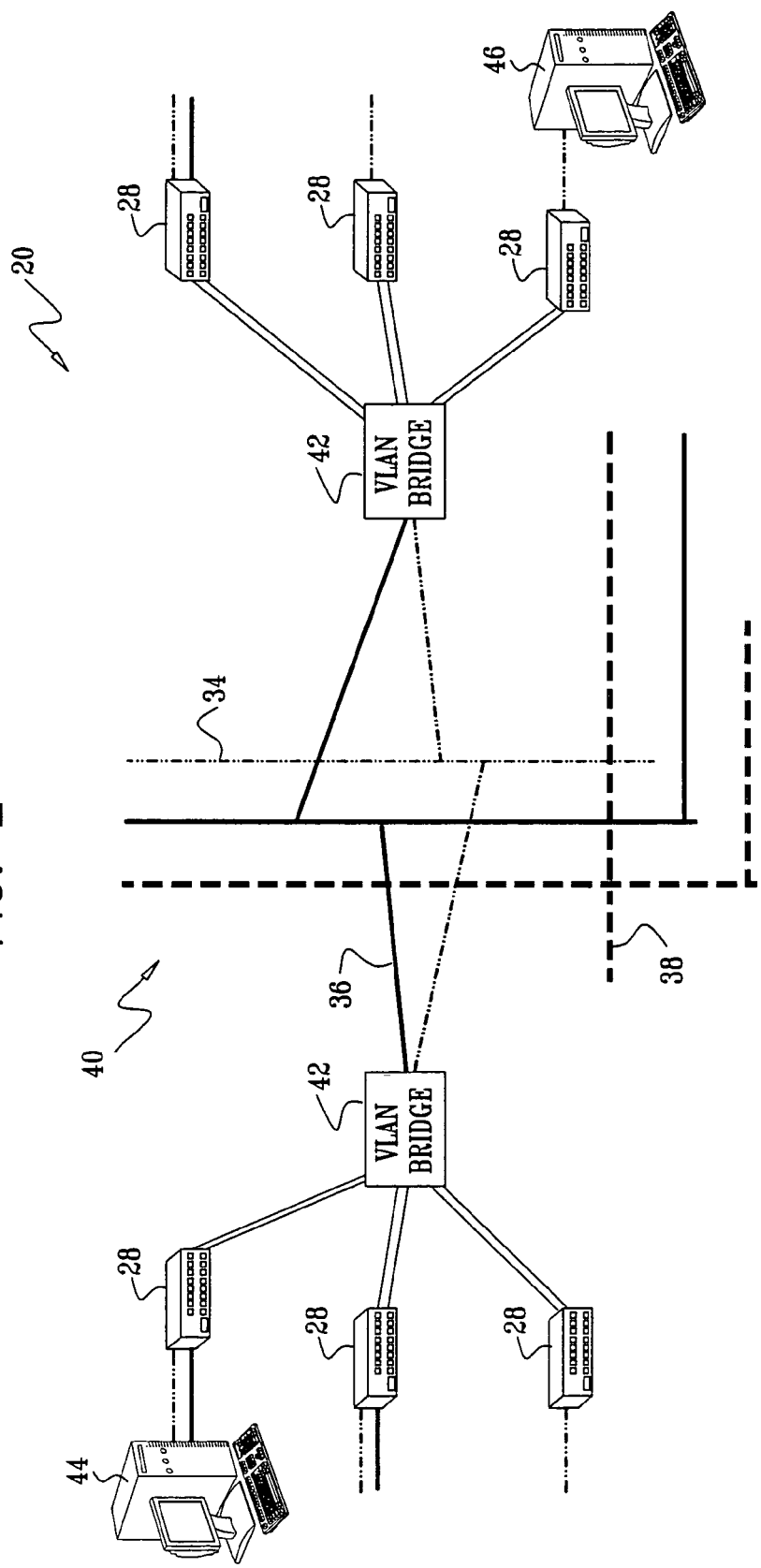
FIG. 2 is a block diagram that schematically illustrates a logical topology of virtual private LAN services carried by the network of FIG. 1, in accordance with an embodiment of the present invention.

FIG. 2 is a block diagram that schematically illustrates a logical topology of network 20, as seen by user nodes 44, 46 served by VPLS instances 34, 36, 38, in accordance with an embodiment of the present invention. Ring network 22 (FIG. 1) appears to the users of each VPLS instance as a shared medium 40, whose underlying ring topology is transparent to the VPLS. For VLAN-based VPLS instances, switches 32 serve as VLAN bridges 42 to other user nodes in the same VLAN on other parts of network 20. Thus, user nodes 44, 46 on any of the VPLS instances may transmit packets to and receive packets from any other user nodes belonging to the same instance without any signaling or routing beyond what is used on the LAN (which possibly including VLAN-related features) to which the user node is connected. Note, however, that connection admission control (CAC) mechanisms on ring network 22 may still limit the availability of bandwidth for connections between the user nodes. A VPLS-oriented technique for connection admission on the ring network is described hereinbelow with reference to FIG. 12.

Figure 3:
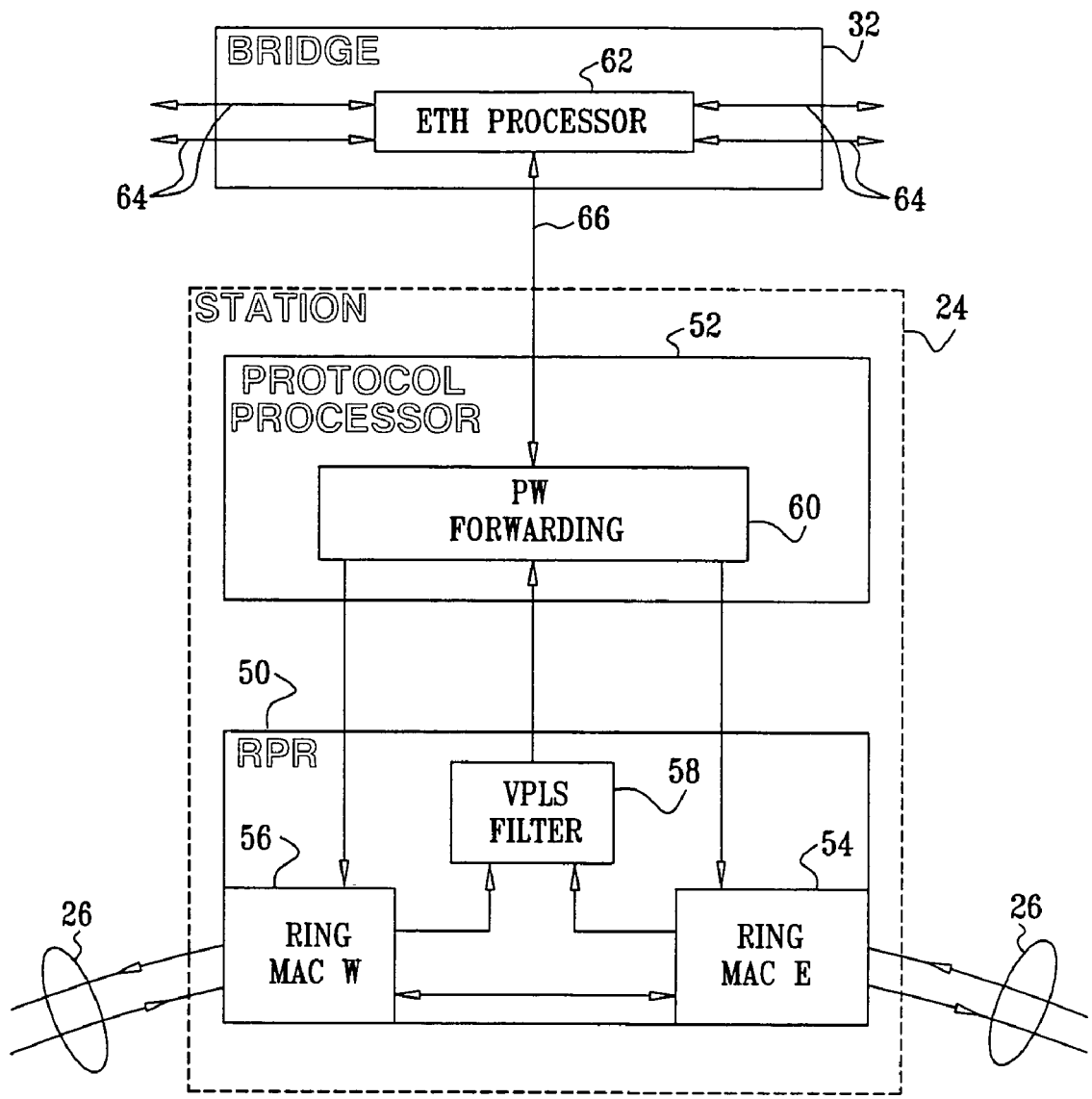
FIG. 3 is a block diagram that schematically shows details of a bridge node in a ring network, in accordance with an embodiment of the present invention.

FIG. 3 is a block diagram that schematically illustrates details of one of nodes 24 on ring network 22, in accordance with an embodiment of the present invention. Node 24 comprises a RPR MAC processor 50, which performs filtering and forwarding of RPR packets on the ring. Processor 50 comprises "east" and "west" ring interfaces 54, 56, which connect to the neighboring spans 26 of the ring network and perform physical layer and MAC processing functions mandated by the 802.17 standard. When interface 54 or 56 receives a packet from the ring, it checks the RPR header parameters, particularly the RPR MAC destination address. If the address is a unicast address and matches the RPR MAC address of this node 24, the ring interface passes the packet directly to a protocol processor 52, for handling by a PW forwarding engine 60, as described further hereinbelow. Otherwise, the receiving interface 54 or 56 just passes the packet through to its counterpart 56 or 54 to continue forwarding the packet around the ring, while decrementing the time-to-live (TTL) in the RPR header. When the TTL value reaches zero, the packet is not forwarded any farther. Packets carrying a broadcast or multicast RPR destination address are copied to an (optional) VPLS filter 58, whose function is described further herein below, and are also forwarded further around the ring. (Although for conceptual clarity, filter 58 is shown in FIG. 3 as a separate unit, its function may in practice be physically integrated with ring interfaces 54 and 56.)

When packets belonging to a particular VPLS instance are flooded on ring network 22, an identification of the VPLS instance is included in the header structure of the RPR packet. A particular header structure that can be used for this purpose is shown in the figures that follow. VPLS filter 58 examines these flooded packets in order to determine whether the VPLS instance to which they belong is one that is served by other circuits of network 20 that are connected to this node 24. (For brevity, in the description that follows and in the claims, we refer to such VPLS instances as the instances that are served by node 24.) Considering FIG. 1, for example, it can be seen that instance 36 is served by nodes C, D and F, while instance 38 is served by nodes A, B and C. Filter 58 recognizes the VPLS identifier in the RPR packet headers. It passes packets belonging to VPLS instances served by this node 24 on to processor 52 for further processing. In this manner, filter 58 reduces substantially the processing burden placed on processor 52. Non-VPLS traffic, which may also be carried by ring network 22, is simply passed on transparently through filter 58.

Processor 52 performs higher-level processing functions with respect to packets transmitted from ring network 22 to other parts of network 20, and vice versa. In RPR terms, processor 52 plays the role of the MAC client and may perform various routing and forwarding functions. For the purpose of VPLS support, processor 52 comprises a pseudo-wire (PW) forwarding engine 60. Engine 60 looks past the RPR header of VPLS packets received from RPR MAC processor 50 and processes the underlying PW frames, in a manner similar to that described in the above-mentioned draft by Martini et al., for example. Processor 52 then passes these frames via a logical port 66 to switch 32, in accordance with PW convention. Engine 60 similarly processes PW frames received from switch 32 for transmission over ring network 22 and performs other VPLS forwarding functions that are described hereinbelow.

Switch 32 comprises an Ethernet bridge processor 62, which processes the user packets—typically Ethernet frames—that are encapsulated in the RPR packets on ring network 22. Processor 62 may also perform VLAN-aware bridge processing. Processor 62 forwards user packets through physical ports 64 to the appropriate LAN circuits. Processor 62 determines the ports to use for forwarding traffic to different MAC addresses using methods of MAC learning that are known in the art.

FIG. 4 is a block diagram that schematically illustrates the format of a VPLS packet 70 transmitted over ring network 22, in accordance with an embodiment of the present invention. The packet format is compliant with the 802.17 standard and with PW-encapsulation, as described by Martini et al. Packet 70 comprises a RPR header, including a RPR tag 80 (comprising TTL and ring control fields), RPR MAC destination address (DA) 82 and RPR MAC source address (SA) 84. The source address identifies the station (i.e., the node 24) that launched the packet on ring network 22. A header error correction (HEC) field 86 provides a cyclic redundancy check (CRC) of the preceding header fields.

Following the RPR header, packet 70 comprises an optional MPLS label 88 and a PW label 90. The PW label includes a VPLS identifier 92 (VPLS ID), which identifies the VPLS instance to which the packet belongs. Labels 88 and 90 are followed by (and encapsulate) a user packet 72, typically an Ethernet frame. The user packet comprises a header including Ethernet MAC DA 74 and SA 76 of the destination and source user nodes (such as nodes 44 and 46 in FIG. 2), along with a data payload 78. Other fields, provided by the applicable standards and specifications, are omitted from FIG. 4 for the sake of brevity and simplicity.

VPLS ID 92 for a given VPLS instance typically has the same value across all nodes in ring network 22. The VPLS ID may be assigned in advance to each VPLS instance by a management station, or it may alternatively be assigned automatically and dynamically by one of the stations in the ring network. Consistent VPLS identification is needed at least for VPLS packets that are multicast (flooded) on ring network 22, in order to enable VPLS filters 58 to be programmed to recognize the VPLS ID of multicast packets that they receive. (This requirement may be relaxed for unicast VPLS packets on the ring network.) Since ring interfaces 54 and 56 forward the multicast packets around the ring without changing their content, each VPLS filter can be programmed with the same table of VPLS identifiers. This pre-assignment of consistent PW labels differs from the conventional practice used in point-to-point PW services, wherein the PW label is retrieved from the downstream node by the upstream node using appropriate signaling.

PW label 90 of unicast VPLS packets may contain the same VPLS ID 92 as multicast packets belonging to the same VPLS instance, and this VPLS ID may be maintained throughout network 20. Alternatively, unicast VPLS packets need not be constrained to have the same VPLS ID as multicast packets, in which case the PW labels for the unicast packets may be determined by signaling, in substantially the same manner as in point-to-point services. Note, however, that in this case measures should be taken to ensure that the (different) unicast and multicast PW labels for any given VPLS instance are associated with the same paths through network 20 in order to satisfy the packet ordering requirements of IEEE 802.1D.

FIGS. 5A and 5B are block diagrams that schematically show details of PW labels 90 in two different types of packets, in accordance with an embodiment of the present invention. FIG. 5A shows a label used for VPLS, with VPLS ID 92 set consistently for all nodes 24 in ring network 22, while FIG. 5B shows a label used for point-to-point PW service, which includes a variable PW label 98. Except for a one-bit flag 96, which may be placed anywhere in the tag depending on the chosen implementation, the rest of the bits can be used for individual service identification, referred to in the figures as a "local ID" 94. Flag 96 is set to "1" if label 90 refers to a VPLS instance and to "0" otherwise. In other possible embodiments, there is no need for a special VPLS indication bit, and processor 52 may simply look up the PW label to determines whether this packet requires VPLS or other service treatment.

Assigning this specific meaning to flag 96 effectively partitions the range of possible PW labels 90 into non-overlapping VPLS and point-to-point VC sub-ranges and facilitates efficient processing of packets by VPLS filter 58. When the filter receives a packet from one of ring interfaces 54 or 56, it may first check flag 96 to determine whether filtering of this packet is required. If the flag bit is set to "1", filter 58 reads VPLS ID 92 to decide whether or not to pass the packet on to PW forwarding engine 60. Otherwise, if the flag bit is "0", filter 58 simply passes the packet on to processor 52 without further action. This arrangement enables the conventional PW label 90 to be used in a novel way for VPLS identification, while still permitting signaling-based assignment of VC labels for point-to-point PW services. It simplifies not only the real-time filtering function of filter 58, but also forwarding functions carried out by PW forwarding engine 60.

FIG. 6 is a block diagram that schematically shows details of RPR DA 82, in accordance with an embodiment of the present invention. The address format shown in FIG. 6 is typically used for multicast packets. In this embodiment, VPLS ID 92 is copied from PW label 90 into the RPR MAC destination address. As a result, filter 58 (as well as PW forwarding engine 60) is immediately able to recognize the VPLS instance to which packet 70 belongs based on the RPR header alone. Alternatively, filter 58 and engine 60 may proceed farther into the packet in order to reach PW label 90 and read the VPLS ID from there, as noted above. Placing the VPLS ID in the RPR header, however, makes the VPLS information more readily available and thus reduces the computational burden on the elements of node 24.

Assigning these special addresses for VPLS is particularly useful in efficient filtering of VPLS packets that are flooded on ring network 22 by RPR multicast. In conventional RPR implementations, the flooded packets simply have a broadcast destination address, as provided by the 802.17 standard. In the embodiment of FIG. 6, however, flooded VPLS packets are identified by a private multicast address preamble 100. The value of preamble 100 is set to 0x3, as specified by the 802.17 standard to enable RPR system users to define private multicast groups. When one of ring interfaces 54 or 56 receives a packet with a preamble of 0x3 in destination address 82, it copies the packet to filter 58, while forwarding the packet over the ring to other members of the multicast group if appropriate. Alternatively, the packet may be forwarded by unicast to each of the RPR nodes that belongs to the VPLS instance in question.

Filter 58 then reads VPLS ID 92 from the destination address field in order to determine whether this node 24 serves the VPLS instance in question. If so, filter 58 passes the packet to processor 52. Otherwise, the filter discards its copy of the packet, thus reducing the computational load on the network processor. Alternatively, if the processing capability of filter 58 is limited (because the operations of RPR MAC processor 50 must be performed in real time, at very high speed), the filter may compare only the least significant bits of VPLS ID 92 to its table of VPLS instances. In this case, processor 52 may still receive some VPLS packets that belong to instances that node 24 does not serve (whereupon processor 52 will discard these packets), but its load is still substantially reduced by filter 58.

A similar multicast filtering mechanism may also be used for VPLS point-to-multipoint applications, such as packet video broadcast.

Unicast packets, destined for a single, known node 24 on ring network 22, may also include a VPLS ID along with the RPR MAC destination address in the RPR DA field. The value of the RPR destination address in this case is assigned from a VPLS forwarding table maintained by processor 52 and/or processor 62. An exemplary form of this table is shown below in Table I:

TABLE I

VPLS FORWARDING TABLE

| User MAC | VPLS ID | User side | | RPR side | |
|---|---|---|---|---|---|
| | | Slot | Port | RPR MAC | Ringlet |
| 1234... | 234 | | | 345 | R |
| 4567... | 567 | 12 | 8 | | |
| ... | ... | ... | ... | ... | ... |

Although the present example relates only to VPLS packets, processor 62 may also maintain a conventional forwarding table, for use in forwarding non-VPLS packets that may be transmitted on network 20.

When processor 62 receives a packet (such as packet 72) through one of ports 64, it looks up MAC DA 74 of the packet in the "user MAC" column of the table. A given user MAC address may belong to more than one VPLS instance. The MAC processor determines the VPLS instance to which the packet belongs based either the port on which the packet was received (for port-based VPLS instances) or the VLAN tag (for VLAN-based VPLS instances). If the table does not contain an entry for this combination of MAC DA and VPLS instance, processor 62 passes the packet to forwarding engine 60 for flooding on ring network 24. The forwarding engine adds the elements of RPR packet 70 that are shown in FIG. 4, including the appropriate multicast RPR MAC DA 82 (FIG. 6A) and PW label 90 including VPLS ID 92. It then passes the packet to RPR MAC processor 50 for transmission on ring network 22.

On the other hand, if the MAC DA and VPLS instance of the incoming packet appear together in an entry of the forwarding table, the entry will indicate whether this DA is on the user side of bridge 32 (reached via one of ports 64) or on the RPR side. In the former case, processor 62 simply forwards the packet to the appropriate user-side slot and port of bridge 32. In the latter case, processor 62 passes the packet to forwarding engine 60, which adds the elements shown in FIG. 4, including the appropriate PW label 90. In this case, however, the packet may be forwarded over ring network 22 in a RPR unicast frame (the standard 802.17 RPR frame format) in order to use the RPR ring more efficiently. The "ringlet" entry in the forwarding table indicates to forwarding engine 60 whether to transmit the packet via east interface 54 or west interface 56. Typically, although not necessarily, this entry is chosen to indicate the shortest path from the RPR node 24 at which the packet is to enter ring network 22 to the destination RPR node. The choice of shortest path is based on the known ring topology, which is distributed to nodes 24 in accordance with the 802.17 standard.

The entries in the forwarding table used at each of nodes 24 may typically be generated using any of the methods defined by the 802.1D standard for building MAC tables. For example, the entries may be statically configured by a system manager. Alternatively or additionally, processor 62 may use dynamic MAC learning, based on the source addresses carried by packets reaching node 24 from ring network 22. Thus, if a packet reaches the MAC processor from ring network 22 with a given VPLS ID 92 and MAC source address 76 for which the forwarding table contains no entry, the MAC processor adds a new entry to the table for this user MAC address and VPLS ID (subject to policy-based constraints that may be used to protect the MAC table against malicious interference). The entry includes, in the RPR MAC column, the RPR MAC source address 84 from which the packet was received, along with an indication of the ringlet on which the packet was received. This information is then used in forwarding subsequent packets to the user MAC address that now appears in the table.

If a packet reaches the MAC processor from the ring network with a combination of user MAC address and VPLS ID that already exists in the table, but a different RPR MAC source from what appears in the table, the corresponding table entry may be updated (again, subject to policy constraints). It may also occur, particularly when steering is used as a fault protection mechanism (as described below with reference to FIG. 7B), that the RPR MAC source address for a given user MAC address remains the same over successive packets, but there is a change in the ringlet on which the packets are received. The table entry may then be updated to indicate the new preferred ringlet. A timer may be associated with each of the forwarding table entries in order to age out unused entries, as specified by the 802.1D standard.

Furthermore, for each packet that reaches the MAC processor from the ring, in addition to the operations above, the user MAC DA may be verified against the existing entries in the MAC learning table. If this MAC address already appears in the table and is associated with a RPR station on the ring, the packet is discarded, as it is clear that the packet destination is not one of the user nodes connected to this port. This sort of filtering, known as "source filtering," prevents excessive loading of the local node resources downstream from processor 52, such as processor 62.

The mechanisms described above enable nodes 24 (and the associated switches 32) to learn the path to use through ring network 22 for packet flows between any pair of user MAC addresses in a given VPLS instance. The nodes learn these paths on the basis of the initial flooded multicast VPLS packets that are transmitted between these user MAC addresses. As a result, subsequent flooding is minimized, and bandwidth consumption is limited to those spans of the ring that are on the point-to-point path between the pair of user nodes in question.

Figure 7A:
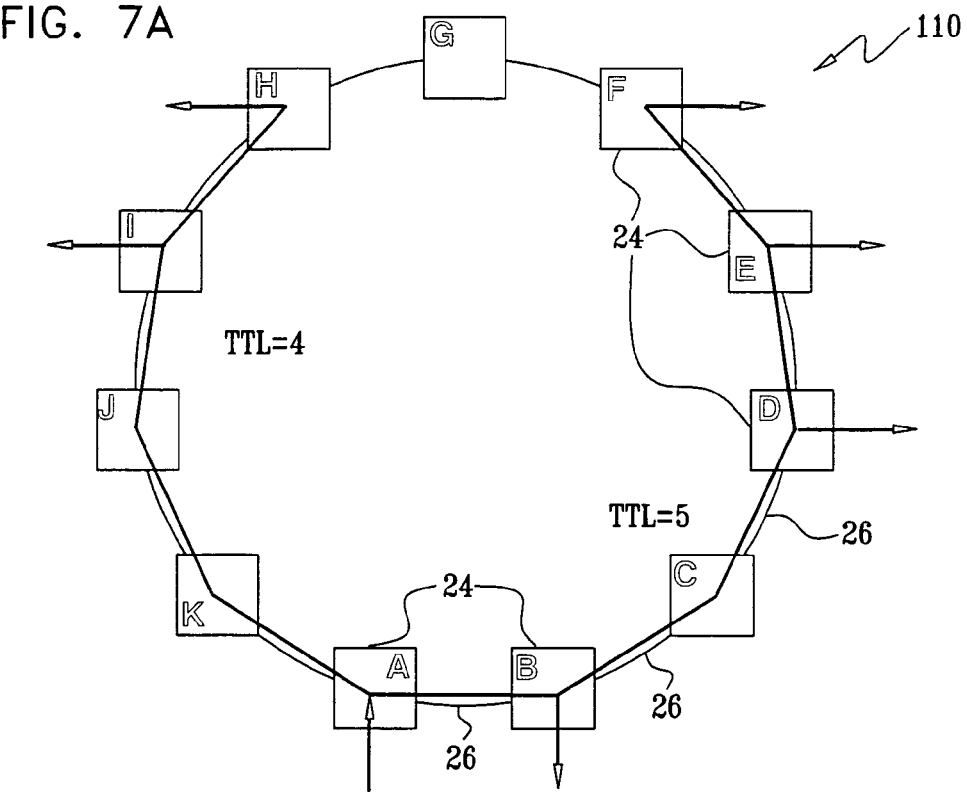
FIG. 7A is a block diagram that schematically illustrates paths taken by a VPLS packet that is transmitted by multicast over a ring network, in accordance with an embodiment of the present invention.

FIG. 7A is a block diagram that schematically illustrates an enhanced method for reducing bandwidth used by multicast traffic in VPLS on a ring network 110, in accordance with an embodiment of the present invention. The method make use of the TTL field in RPR preamble 80. In this example, node A receives a packet that is to be multicast to members of a particular VPLS instance, which is served by nodes B, D, E, F, H and I. The remaining nodes do not serve this VPLS instance, so that there is no need for the multicast packet to be forwarded to node G.

Node A is aware of the topology of the nodes 24 in network 110 that serve each VPLS instance on the network. This information may be distributed among the nodes by extending the information inside topology control frames distributed among the ring nodes, in the manner specified by IEEE 802.17, for example. Thus, node A can compute the maximal number of hops required to reach all the nodes serving the VPLS instance in question, and can thus determine that the multicast packet it is about to send need traverse no more than five hops on the right ringlet (from A to F) and no more than four hops on the left ringlet (from A to H). Accordingly, node A sets the TTL value of the multicast packet that it transmits on the right ringlet to the value TTL=5, and on the left ringlet to TTL=4. Each node 24 decrements the TTL value by one before forwarding the packet, so that when the packets reach nodes F and H, the TTL value has dropped to zero. As a result, there is no bandwidth wasted in transmitting the packet on spans F-G and H-G. In other words, this mechanism permits bandwidth to be conserved on at least one span 26, and typically on two or more spans of ring network 22.

Figure 7B:
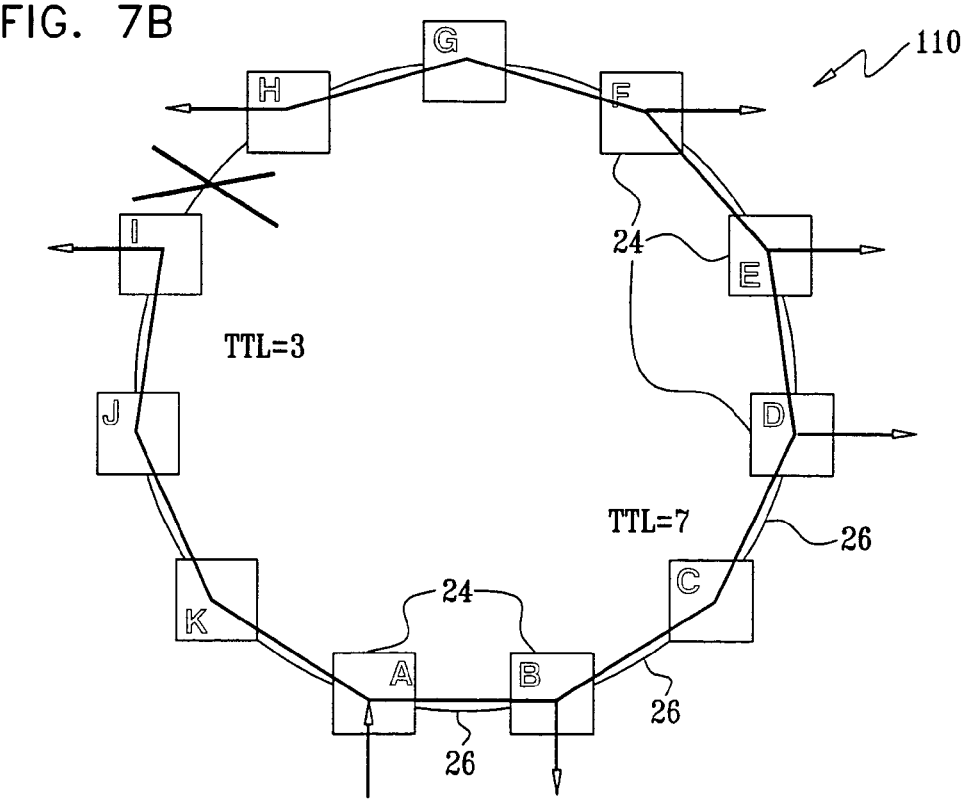
FIG. 7B is a block diagram that schematically illustrates paths taken by a VPLS packet that is transmitted by multicast over a ring network after occurrence of a fault in a span of the ring network, in accordance with an embodiment of the present invention.

FIG. 7B is a block diagram that schematically illustrates reconfiguration of multicast transmission in network 110 upon occurrence of a fault on the span between nodes H and I, in accordance with an embodiment of the present invention. RPR networks support two protection modes in case of failure: steer and wrap. In wrap mode, source nodes continue to transmit packets in the same direction, regardless of the existence or non-existence of a failure event on the ring. In steer mode, however, the node transmitting a packet on the ring may change the direction of transmission in order to avoid a faulty span. This is the mode that is operative in FIG. 7B. Node A now transmits the multicast packet to node H not through the left ringlet, as in FIG. 7A, but through the right ringlet.

As node A is aware of the fault between nodes H and I (based on standard RPR signaling), it sets the TTL values of the multicast packets to new values of TTL=7 (right) and TTL=3 (left) in order to reach all the nodes serving the VPLS instance in question. Setting the TTL values to the proper new values prevents the nodes (such as node H) from receiving duplicated packets when the fault is rectified. The TTL values may subsequently be returned to their previous settings when the fault has been cleared.

Steering-based protection in VPLS is complicated by the learning process involved in building and revising the forwarding tables used by the nodes (as exemplified by Table I above). When steering protection is activated, the "ringlet" entries in the table will be modified accordingly. The learning mechanism described above may be used for this purpose. Processor 52 may check the ringlet entries periodically against the known topology of ring 110 (including changes in the topology when they occur) in order to ensure that the ring indicated by the table is the optimal one in each case. Packet steering should be turned on and off with care in order to avoid misordering in arrival of packets sent before and after steer is activated or deactivated.

Wrapping-based protection uses the bandwidth on the ring network less efficiently, but is simpler to implement. For wrapping protection in the example shown in FIG. 7B, node A simply sets the "wrap" bit in the RPR header of the packets that it sends. When the multicast packet that is destined for node H via the left ringlet reaches node I, node I will transmit the packet back around the ring in the opposite direction. TTL decrementation is suspended when wrapping occurs. In this case, the multicast packet will reach node H via node G, and there is no need to change the forwarding table entries.

The methods for bandwidth conservation using the TTL value may similarly be used, mutatis mutandis, in unicast forwarding of VPLS packets on a ring network.

Figure 8:
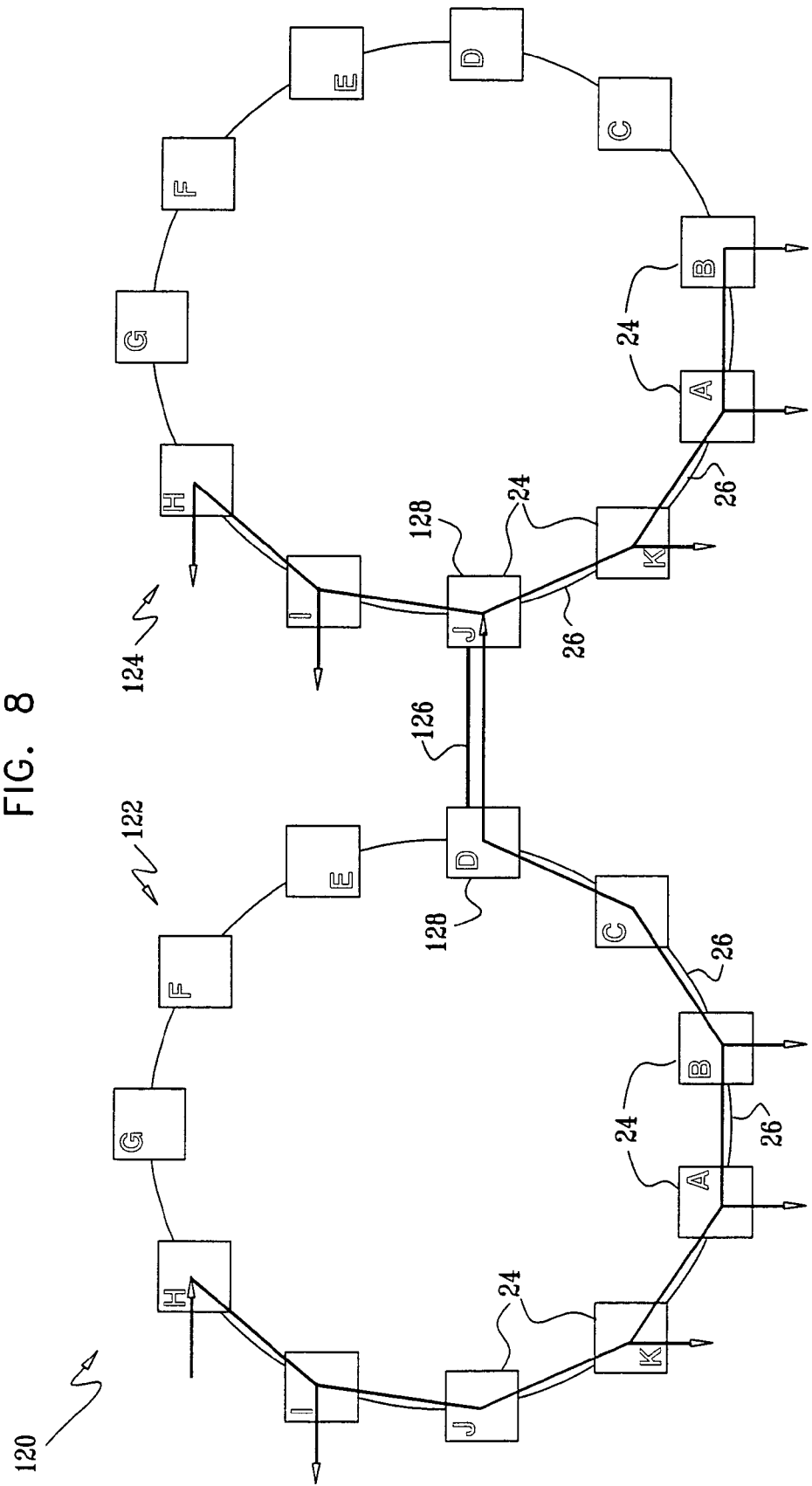
FIG. 8 is a block diagram that schematically illustrates transmission of a packet over a VPLS that extends over two ring networks, in accordance with an embodiment of the present invention.

FIG. 8 is a block diagram that schematically illustrates provision of VPLS over a network 120 that comprises two ring networks 122 and 124, in accordance with an embodiment of the present invention. Networks 122 and 124 are connected by a link 126 between bridge nodes 128. Various implementations of this link are possible, as described further hereinbelow. In one embodiment, link 126 comprises a VLAN trunk, while in another embodiment link 126 comprises a PW connection via a MPLS tunnel. A port-based Ethernet connection or other point-to-point link could also be used. The VPLS instance in this example is served by nodes on both rings, so that a packet that is multicast by node H onto ring network 122 traverses link 126 to reach destination nodes on ring network 124. The same VPLS ID may be maintained on both ring networks, or alternatively, bridge nodes 128 may use different VPLS IDs on the two ring networks.

FIG. 9 is a block diagram that schematically illustrates packet structures used in network 120, assuming link 126 to comprise a VLAN trunk, in accordance with an embodiment of the present invention. A RPR packet 130 is transmitted on ring network 122 and reaches bridge node D. The structure of packet 130 is similar to that of packet 70 (FIG. 4), encapsulating a corresponding user packet 132 in the form of an Ethernet frame having a type field 134. (In this example, type 0800 means the frame has an IP payload, but in any case, the methods of VPLS forwarding described herein are generally transparent to the user payload). PW label 90 is set in accordance with the applicable point-to-point signaling methods for an Ethernet PW, such as the method described in the above-mentioned draft by Martini, et al.

Upon receiving packet 130, node D in network 122 examines the VPLS ID value and determines that the packet is to be transmitted over the VLAN trunk that constitutes link 126. For this purpose, the processor 52 of node D extracts user packet 132 from RPR packet 130, and converts the user packet into a VLAN-type packet 140, which is suitable for transmission over Ethernet link 126. Packet 140 comprises a type field 142, identifying the packet as a VLAN packet (type 8100, for example, or any other appropriate VLAN type field), and a VLAN tag 144 giving the VLAN ID of the packet (ID=100). In other words, node D maps the VPLS ID of packet 130 to the VLAN ID of packet 140, and then transmits the VLAN packet over link 126 to node J of ring network 124. Node J performs the reverse process of mapping the VLAN ID of packet 140 to the appropriate VPLS ID to be used on network 124. Node J then encapsulates user packet 132 in a suitable RPR packet, using this VPLS ID, for transmission to the receiving nodes on network 124.

Multiple VPLS instances may be defined in this way on network 120. Each instance will have its own VPLS ID on networks 122 and 124, which map to a unique VLAN ID on link 126.

FIG. 10 is a block diagram that schematically illustrates the structure of a packet 150 transmitted on link 126 in an alternative embodiment of the present invention, in which link 126 comprises a MPLS interface. Packet 150 is generated by node D upon receiving packet 130 on network 122. Packet 150 comprises a Layer-2 interface header 152 and a PW header structure 154, which encapsulates user packet 132. Header 152 may simply be an Ethernet header, for example, assuming link 126 to be based physically on an Ethernet link, or it may belong to substantially any other suitable Layer-2 protocol. Header structure 154 comprises (optional) MPLS label 88 and PW label 90. The PW label of packet 150 is determined by the applicable point-to-point signaling scheme, such as the scheme described by Martini et al., as noted above. In this manner, the same multipoint VPLS instance on both of ring networks 122 and 124 is mapped directly through the point-to-point PW of link 126 that connects the ring networks, so that the PW label implicitly identifies the VPLS instance. Although it is possible to use a consistent VPLS instance identifier throughout the network, there is no requirement that such a consistent VPLS instance identifier be used.

Figure 11:
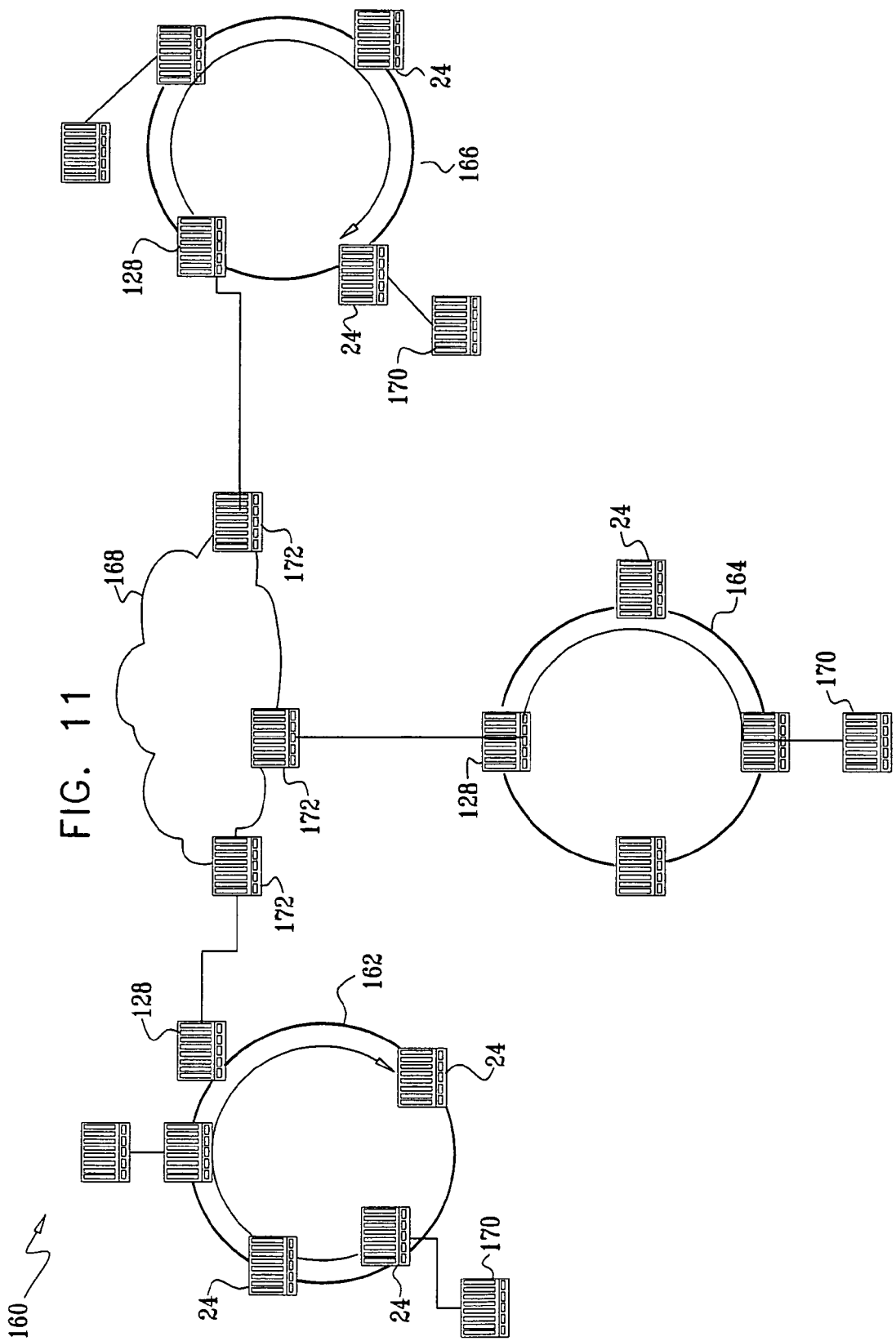
FIG. 11 is a block diagram that schematically illustrates a VPLS that extends over multiple ring networks, which are linked together through another packet network, in accordance with an embodiment of the present invention.

FIG. 11 is a block diagram that schematically illustrates a network 160 of more complex topology, over which a VPLS may operate, in accordance with an embodiment of the present invention. In this example, network 160 comprises a number of ring networks 162, 164, 166, which are linked together through a generic Layer-2 or Layer-3 network 168. VPLS instances on the ring networks are linked together by appropriate connections through network 168. For example, if network 168 is a Layer-2 network, each VPLS instance may be mapped to a VLAN on network 168, as described above with reference to FIG. 9. Alternatively, if network 168 is a Layer-3 network, the VPLS instances may be connected by MPLS or other tunnels through network 168. In this latter case, bridge nodes 128 on rings networks 162, 164 and 166 and corresponding edge nodes 172 to which they connect on network 168 may each comprise a MPLS label-switched router (LSR). The inter-ring connections operate in network 160 in substantially the same manner as the point-to-point ring connection shown in FIG. 8, and permit user nodes 170 belonging to the same VPLS instance to communicate with one another as though they were on the same LAN.

An Ethernet PW may be connected to a RPR-based VPLS, in the manner described above not only for the purpose of connecting two RPR VPLS domains, but for other applications, as well. For example, the Ethernet PW may be used to connect a remote Ethernet port to a local RPR VPLS instance. As another example, the RPR VPLS instance can be connected to a hierarchical VPLS. In this latter case, the whole RPR VPLS instance is regarded as a leaf in the virtual topology of the hierarchical VPLS, and the Ethernet PW connecting the RPR VPLS instance to the hierarchical VPLS is functionally the same as a PW that is used to connect a spoke node to the hierarchical VPLS in systems known in the art.

Figure 12:
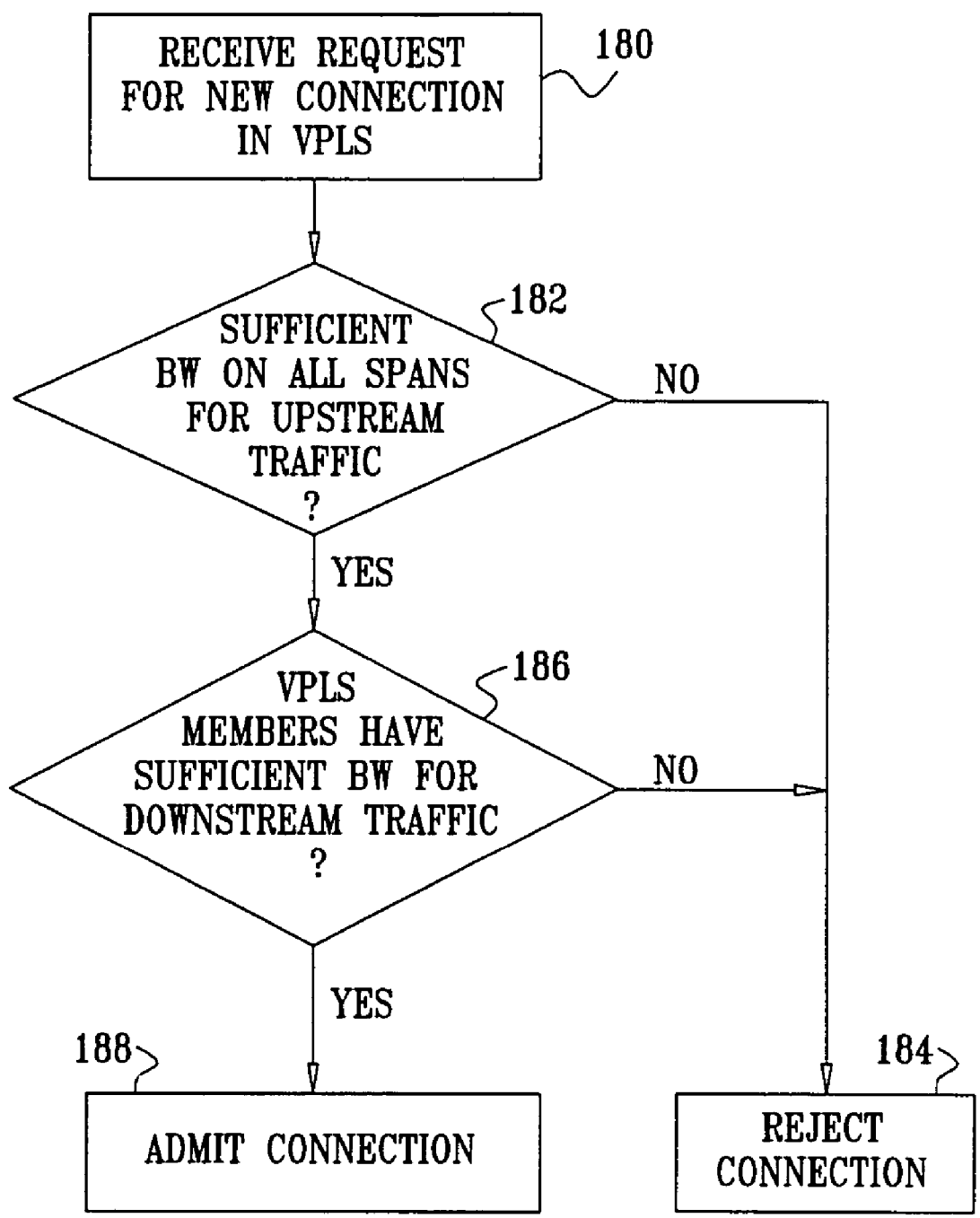
FIG. 12 is a flow chart that schematically illustrates a method for connection admission control, in accordance with an embodiment of the present invention.

FIG. 12 is a flow chart that schematically illustrates a method for controlling admission of new connections to a given VPLS instance that is operating on a ring network, in accordance with an embodiment of the present invention. In RPR networks, requests to establish new connections may be regulated by a connection admission controller (CAC). The CAC assumes that each new user of the ring network will attempt to communicate with all other users, and thus checks for availability of bandwidth on all spans of the ring before approving the connection. Available bandwidth is monitored and allocated in terms of the committed information rate (CIR), i.e., guaranteed bandwidth, and Peak information rate (PIR) of each connection. In this embodiment, the topology of the VPLS instance in question is used by the CAC in more accurately judging bandwidth requirements and tracking remaining bandwidth availability.

The method of FIG. 12 is initiated when the CAC receives a request from the operator to establish a new connection within an existing VPLS instance, at a connection request step 180. (The method may be applied, mutatis mutandis, to establishment of new VPLS instances, as well.) The new connection request may be either a request by an existing user of the VPLS instance for an increase in bandwidth, or a request by a new user to join the VPLS. The CAC first checks the available upstream bandwidth, at an upstream checking step 182. Upstream transmission refers to transmission from user nodes via the ring nodes onto the spans of the ring network. All spans of the ring network are checked for bandwidth availability, since in case of a failure (as shown in FIG. 7B, for example), the VPLS instance may need to use all spans of the ring even if this is not normally the case (as in FIG. 7A). If the required bandwidth for the new connection will exceed the available bandwidth on any of the spans (taking into account the overbooking percentage permitted by the system operator and various potential failure scenarios on the ring), the CAC will refuse to add the new connection to the VPLS, at a rejection step 184.

Next, the CAC checks the availability of downstream bandwidth on each of the ring nodes that serves the VPLS instance in question, at a downstream checking step 186. Downstream transmission refers to transmission from the ring network via the ring network nodes to user nodes and other networks. The downstream bandwidth requirement imposed on each ring network node that serves a given VPLS instance is given by the sum of the upstream bandwidth allocations made by the CAC to all the members of the VPLS. Thus, the downstream bandwidth in the VPLS instance does not divide among all the ring network nodes, but rather only among the subset of the nodes that are assigned to serve this instance. Again, an overbooking factor may be used, so that the capacity required of each ring network node is equal to the total upstream allocation divided by the overbooking. To the extent that a given node serves more than a single VPLS instance or serves other, non-VPLS connections, the other instances and/or connections are also taken into account in determining the downstream bandwidth availability on the node. If all the nodes serving the VPLS instance in question have sufficient downstream bandwidth available to accommodate the new connection, the CAC admits the connection, at an admission step 188. Otherwise, the connection is rejected at step 184.

After admitting a new connection at step 188, the CAC updates its records of bandwidth availability to reflect the reduced bandwidth remaining after new upstream and downstream allocations. If a VPLS connection is terminated, on the other hand, the CAC may accordingly increase its records of available bandwidth.

The method described above assumes worst-case bandwidth usage on all connections between all nodes in a VPLS instance. In fact, this assumption is not always correct. For example, a VPLS instance may be configured logically in a star topology (as in a packet video application), wherein one of the ring network nodes functions as the hub and the others function as spokes. In this case, all the traffic on this VPLS instance will pass between the hub and spoke nodes, with little or none of the traffic passing from one spoke to another. The bandwidth received by the hub node will therefore equal the sum of the bandwidths transmitted by the spoke nodes, and the traffic sent by the hub node is typically equally distributed among the spokes. This logical topology may be used by the CAC in order to weight the bandwidth evaluations made at steps 182 and 186 to more accurately reflect the expected traffic pattern. Similar considerations may be taken into account when VPLS instances have other traffic patterns, such as a full-mesh equal distribution. In this case the traffic sent by each node can be assumed to be spread equally among all other nodes.

Methods for using logical topology information in bandwidth allocation decisions are further described in a U.S. patent application entitled, "Multipoint to Multipoint Communication over Ring Topologies," filed Sep. 3, 2004, which is assigned to the assignee of the present patent application, and whose disclosure is incorporated herein by reference. These methods may be adapted for use in conjunction with the method of FIG. 12, as described hereinabove.

Although the embodiments described above make reference specifically to RPR networks and to certain protocols and standards that may be applied in establishing virtual connections between and within such networks, the principles of the present invention are similarly applicable to ring networks and protocols of other types. It will thus be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. A method for communication via a ring network that includes a plurality of nodes associated with a Virtual Private LAN Service (VPLS), the method comprising:
   receiving at a first node in the ring network a data packet transmitted over a virtual LAN, the data packet comprising a virtual LAN identifier, which is one of:
   a VLAN ID and
   a port identifier;
   wherein the first node comprises a bridge node, and the data packet received at the first node comprises a destination address outside the ring network;
   mapping the virtual LAN identifier into a VPLS identifier (VPLS ID), wherein the VPLS ID has the same value for both unicast and multicast packets across all the nodes of the ring network;
   replacing the virtual LAN identifier with the VPLS ID in the data packet; reading the VPLS ID from the data packet at the first node; and
   responsively to reading the VPLS ID, forwarding the data packet from the first node to at least one second node among three or more of the nodes in the ring network that are associated with the VPLS;
   wherein forwarding the data packet comprises checking the destination address and the VPLS ID against a forwarding table to determine the at least one second node on the ring network to which the data packet should be forwarded;
   assigning a subset of the nodes of the ring network to serve the VPLS, wherein forwarding the data packet comprises, if the forwarding table does not include an entry corresponding to the destination address and the VPLS ID, multicasting the data packet to the subset of the nodes;
   wherein multicasting the data packet comprises setting a time-to-live (TTL) value of the data packet so that the data packet will reach all the nodes in the subset serving the VPLS without traversing at least one span of the ring network; and
   wherein setting the TTL value comprises determining a minimal number of hops required to reach all the nodes in the subset serving the VPLS, and setting the TTL value to the minimal number.

2. The method according to claim 1, wherein the data packet comprises a pseudo-wire (PW) label, and wherein the PW label comprises the VPLS ID.

3. The method according to claim 2, wherein the ring network is configured to support a point-to-point tunneling service, and wherein the PW label comprises a flag indicating whether the data packet is associated with the VPLS or with the point-to-point service.

4. The method according to claim 1, wherein the ring network operates in accordance with a resilient packet ring (RPR) protocol, and wherein the data packet comprises a RPR destination address, which comprises the VPLS ID.

5. The method according to claim 4, wherein the RPR destination address is a multicast address, which identifies a set of the nodes of the ring network that serve the VPLS, and wherein forwarding the data packet comprises multicasting the data packet to the nodes in the set.

6. The method according to claim 4, wherein forwarding the data packet comprises identifying a destination node to which the data packet is directed, and forwarding the data packet by unicast over the ring network to the RPR destination address of one of the nodes in the ring network that serves the destination node.

7. The method according to claim 4, wherein the RPR destination address is a broadcast address, and wherein forwarding the data packet comprises broadcasting the data packet to the nodes in the ring network.

8. The method according to claim 1, wherein receiving the data packet comprises receiving the data packet over a span of the ring network, and wherein reading the VPLS ID comprises filtering the packet using a ring media access control (MAC) processor at the first node in order to determine whether to copy or forward the data packet.

9. The method according to claim 8, wherein filtering the packet comprises comparing the VPLS ID to a list of one or more VPLS instances that the first node is assigned to serve, and comprising copying the data packet from the ring MAC processor to a protocol processor of the first node if the VPLS ID matches an entry on the list.

10. The method according to claim 1, wherein the first node comprises a bridge node, and wherein receiving the data packet comprises receiving the data packet over a link to the bridge node from a source node outside the ring network, and wherein forwarding the data packet comprises converting the data packet to a packet format that is compliant with a ring network protocol and includes the VPLS identifier.

11. The method according to claim 10, wherein the ring network protocol comprises a resilient packet ring (RPR) protocol, and wherein converting the data packet comprises inserting the VPLS identifier in a RPR destination address of the data packet.

12. The method according to claim 11, wherein the RPR destination address comprises a multicast destination address, which is determined responsively to the data packet received over the link.

13. The method according to claim 10, wherein receiving the data packet over the link comprises reading a destination address of the data packet, and wherein forwarding the data packet comprises checking the destination address and the VPLS ID against a forwarding table held at the first node, and determining the at least one second node to which the data packet should be forwarded based on the forwarding table.

14. The method according to claim 13, wherein forwarding the data packet comprises, if the forwarding table does not contain an entry corresponding to the destination address and the VPLS ID, multicasting the packet to a subset of the nodes of the ring network that are assigned to serve the VPLS.

15. The method according to claim 1, wherein checking the destination address and the VPLS ID comprises reading from the forwarding table a direction in which to forward the data packet around the ring to the at least one second node, and wherein forwarding the data packet comprises transmitting the data packet around the ring in the direction.

16. The method according to claim 15, wherein checking the destination address comprises identifying one of the nodes in the ring network that serves the destination address, and wherein transmitting the data packet comprises computing a number of hops required to reach the one of the nodes, and setting a time-to-live (TTL) value of the data packet to the computed number.

17. The method according to claim 1, wherein the VPLS comprises at least first and second VPLS instances that are operative on the ring network, and wherein reading the VPLS ID comprises making a determination that the data packet is associated with the first instance, and wherein forwarding the data packet comprises selecting the at least one second node responsively to the determination.

18. The method according to claim 17, and comprising assigning first and second subsets of the nodes of the ring network to serve, respectively, the first and second instances, and wherein selecting the at least one second node comprises choosing one or more of the nodes in the first subset.

19. The method according to claim 1, wherein receiving the data packet comprises receiving the data packet over a link from outside the ring network in a link packet format, wherein the received data packet comprises a first VPLS identifier that identifies the VPLS on the link, and wherein forwarding the data packet comprises mapping the first VPLS identifier to a second VPLS identifier, and formatting the data packet for transmission over the ring network in a ring packet format, and inserting the second VPLS identifier in the data packet.

20. The method according to claim 19, wherein the VPLS is configured to operate on first and second ring networks, which are connected by the link therebetween.

21. A method for communication via a ring network that includes a plurality of nodes associated with a Virtual Private LAN Service (VPLS), the method comprising:
   assigning first and second subsets of the nodes of the ring network to serve, respectively, first and second instances of a virtual LAN, at least one of the first and second subsets comprising three or more of the nodes in the ring network;
   assigning respective first and second virtual LAN identifiers to the first and second instances, wherein each virtual LAN identifier is one of: a VLAN ID and a port identifier:
   receiving at a first node in the first subset a data packet transmitted over the first instance of the virtual LAN, the data packet comprising the first virtual LAN identifier;
   wherein the first node also belongs to the second subset;
   mapping the virtual LAN identifier into a VPLS identifier (VPLS ID), wherein each of the VPLS IDs has the same respective value for both unicast and multicast packets across all the nodes of the ring network;
   replacing the virtual LAN identifier with the VPLS ID in the data packet;
   receiving at the first node a further data packet transmitted over the second instance of the VPLS, and forwarding the further data packet selectively from the first node to one or more of the nodes in the second subset that are not in the first subset; and
   responsively to the first VPLS ID, forwarding the data packet selectively from the first node to one or more additional nodes in the first subset;
   wherein forwarding the data packet selectively comprises multicasting the data packet only to the nodes in the first subset; and
   wherein multicasting the data packet comprises setting a time-to-live (TTL) value of the data packet so that the data packet will reach all the nodes in the first subset without traversing at least one span of the ring network.

22. The method according to claim 21, wherein forwarding the data packet selectively comprises unicasting the data packet to at least one of the nodes in the first subset.

23. The method according to claim 22, wherein unicasting the data packet comprises setting a time-to-live (TTL) value of the data packet so that the data packet will reach the at least one or the nodes in the first subset without traversing at least one span of the ring network.

24. The method according to claim 21, wherein the data packet comprises a pseudo-wire (PW) label, and wherein the PW label comprises the first VPLS ID, wherein the first and second instances are assigned different, respective first and second label values.

25. The method according to claim 21, wherein the ring network operates in accordance with a resilient packet ring (RPR) protocol, and wherein the data packet comprises a RPR destination address, which comprises the first VPLS ID.

26. The method according to claim 21, wherein receiving the data packet comprises receiving the data packet over a span of the ring network, and wherein forwarding the data packet comprises filtering the data packet using a media access control (MAC) processor at the first node.

27. The method according to claim 21, wherein the first node comprises a bridge node, and wherein receiving the data packet comprises receiving the data packet over a link to the bridge node from a source node outside the ring network, the data packet comprising a destination address outside the ring network, and wherein forwarding the data packet comprises reading a destination address of the data packet, and checking the destination address and the first VPLS ID against a forwarding table held at the first node, and determining the at least one second node to which the data packet should be forwarded based on the forwarding table.

28. The method according to claim 27, wherein forwarding the data packet comprises, if the forwarding table does not contain an entry corresponding to the destination address and the first VPLS ID, multicasting the packet to the nodes of the ring network that are in the first subset.

29. The method according to claim 27, wherein checking the destination address and the first VPLS ID comprises reading from the forwarding table a direction in which to forward the data packet around the ring to the at least one second node, and wherein forwarding the data packet comprises transmitting the data packet around the ring in the direction.

30. The method according to claim 21, wherein receiving the data packet comprises receiving the data packet over a link from outside the ring network in a link packet format, wherein the received data packet comprises an external VPLS identifier that identifies the first instance of the VPLS on the link, and wherein forwarding the data packet comprises mapping the external VPLS identifier to the first VPLS ID, and formatting the data packet for transmission over the ring network in a ring packet format, and inserting the first VPLS ID in the data packet.

31. A method for communication via a ring network that includes a plurality of nodes associated with a Virtual Private LAN Service (VPLS), the method comprising:
   assigning a subset comprising three or more of the nodes of the ring network to serve a VPLS;
   assigning a VPLS identifier (VPLS ID) to the VPLS, wherein the VPLS ID has the same value for both unicast and multicast packets in the VPLS across all the nodes of the ring network:
   receiving at a bridge node in the ring network a data packet containing a virtual LAN identifier, the data packet comprising a destination address outside the ring network, wherein the virtual LAN identifier is one of:
   a VLAN ID and a port identifier;
   mapping the virtual LAN identifier into the VPLS ID;
   replacing the virtual LAN identifier of the data packet with the VPLS ID, checking the destination address and the VPLS ID against a forwarding table to locate a destination node on the ring network to which the data packet should be forwarded;
   finding an entry in the forwarding table indicating the destination node in the subset of the nodes of the ring network that corresponds to the destination address of the data packet, and unicasting the data packet to the destination node for forwarding over the VPLS to the destination node;

wherein the entry further indicates a direction of transmission on the ring network from the bridge node to the destination node, and
wherein unicasting the data packet comprises transmitting the data packet in the indicated direction;
learning the direction of transmission responsively to one or more previous packets received from the ring network at the bridge node; and
if the forwarding table does not indicate the destination node corresponding to the destination address of the data packet, distributing the data packet to the subset of the nodes.

32. The method according to claim 31, wherein learning the direction of transmission comprises finding a shortest path between the bridge node and the destination node.

33. The method according to claim 31, and comprising discovering a faulty span in the ring network, and changing the direction of transmission indicated in the table so as to steer the data packet to the destination node while avoiding the faulty span.

34. The method according to claim 31, wherein the ring network operates in accordance with a resilient packet ring (RPR) protocol, and wherein distributing the data packet comprises inserting in a header of the packet a multicast RPR destination address corresponding to the VPLS.

35. The method according to claim 34, wherein the multicast RPR destination address comprises a private multicast address, which comprises the VPLS ID, so that the multicast data packet is not copied by the nodes of the ring network that are outside the subset.

36. The method according to claim 31, wherein the ring network operates in accordance with a resilient packet ring (RPR) protocol, and wherein distributing the data packet comprises inserting in a header of the packet a unicast RPR destination address corresponding to the VPLS.

37. The method according to claim 31, wherein distributing the data packet comprises setting a time-to-live (TTL) value of the data packet so that the data packet will reach all the nodes in the subset without traversing at least one span of the ring network.

38. The method according to claim 31, wherein the VPLS comprises at least first and second VPLS instances that are operative on the ring network, and wherein assigning the subset comprises assigning first and second subsets of the nodes, respectively, to serve the first and second instances.

39. The method according to claim 31, wherein receiving the data packet comprises receiving the data packet over a link from outside the ring network in a link packet format, wherein the received data packet comprises an external VPLS identifier that identifies the VPLS on the link, and wherein forwarding the data packet comprises mapping the external VPLS identifier to the VPLS ID, and formatting the data packet for transmission over the ring network in a ring packet format, and inserting the VPLS ID in the data packet.

40. A method for communication via a bi-directional ring network that includes a plurality of nodes associated with a Virtual Private LAN Service (VPLS) and spans interconnecting the nodes, the method comprising:
assigning a subset of the nodes of the ring network to serve a VPLS, such that two of the nodes in the subset are separated from one another by at least two adjacent spans of the network;
assigning a VPLS identifier (VPLS ID) to the VPLS, wherein the VPLS ID has the same value for both unicast and multicast packets in the VPLS across all the nodes of the ring network;
receiving at a first node in the subset a data packet having a virtual LAN identifier for transmission over the VPLS, wherein the virtual LAN identifier is one of: a VLAN ID and a port identifier;
mapping the virtual LAN identifier into the VPLS ID and replacing the virtual LAN identifier with the VPLS ID in the data packet,
determining a respective maximal number of the spans that must be traversed by the data packet in each direction around the ring network in order to reach all the nodes in the subset from the first node; and
multicasting the data packet from the first node to the nodes in the subset in both directions around the ring network, while setting a time-to-live (TTL) value of the data packet responsively to the respective maximal number so that the data packet does not traverse the at least two adjacent spans in either direction in the ring network;
wherein multicasting the data packet comprises transmitting first and second copies of the data packet in respective, mutually-opposing first and second directions around the ring network;
wherein setting, the TTL value comprises setting first and second TTL values, respectively, in the first and second copies of the data packet so as to minimize the number of the spans that will be traversed by the data packet while reaching all the nodes in the subset; and
wherein transmitting the first and second copies comprises, upon occurrence of a fault in one of the spans of the network, steering at least one of the first and second copies so as to avoid the fault, and wherein setting the first and second TTL values comprises adjusting at least one of the TTL values responsively to the steering.

41. The method according to claim 40, wherein the ring network operates in accordance with a resilient packet ring (RPR) protocol, and wherein multicasting the data packet comprises applying to the data packet a private multicast RPR destination address, which identifies the subset.

42. The method according to claim 40, wherein the VPLS comprises at least first and second VPLS instances that are operative on the ring network, wherein assigning the subset comprises assigning first and second subsets of the nodes, respectively, to serve the first and second instances, and wherein multicasting the data packet comprises reading from the data packet a VPLS identifier indicating whether the packet belongs to the first or the second instance, and selecting one of the first and second subsets to which the data packet is to be multicast responsively to the VPLS identifier.

43. A method for communication via a network that includes a plurality of nodes in a predefined topology, the method comprising:
assigning a subset of the nodes of the network to serve a virtual private LAN service (VPLS), the subset defining a VPLS topology within the predefined topology;
receiving a request to admit a new connection on the VPLS;
assessing availability of bandwidth to serve the new connection based on the VPLS topology; and
determining whether to admit the new connection responsively to the availability of the bandwidth,
wherein the predefined topology comprises a ring, in which the nodes are interconnected by spans of the ring, and wherein assessing the availability of the bandwidth comprises assessing an upstream bandwidth required by the new connection on the spans of the ring and assessing a downstream bandwidth required by the new connection via the nodes in the subset to destinations outside the ring, and wherein assessing the downstream bandwidth comprises summing bandwidth requirements of all connections served by each of the nodes in the subset, and verifying that each of the nodes in the subset has sufficient downstream bandwidth available to serve the new connection, and wherein assigning the subset comprises assigning at least one of the nodes in the subset to serve a first instance of the VPLS, but not a second instance of the VPLS, and wherein summing the bandwidth requirements comprises, for the at least one of the nodes, summing the bandwidth requirements of the connections on the first instance of the VPLS, but not the connections on the second instance of the VPLS.

44. Apparatus for communication via a ring network that includes a plurality of nodes associated with a Virtual Private LAN Service (VPLS), the apparatus comprising:

first and second ring interfaces, which are adapted to couple a first node to respective first and second spans of the ring network;

a bridge, comprising one or more ports for coupling the first node to one or more user nodes outside the ring network; and processing circuitry, which is adapted to receive via one of the ports a data packet transmitted from a source node over a virtual LAN, the data packet comprising a virtual LAN identifier, to map the Virtual LAN identifier into a VPLS identifier (VPLS ID) and to replace the virtual LAN identifier with the VPLS ID in the data packet, wherein the virtual LAN identifier is one of: a VLAN ID and a port identifier, and wherein the VPLS ID has the same value for both unicast and multicast packets in the VPLS across all the nodes of the ring network, to read the VPLS ID from the data packet, and responsively to reading the VPLS ID, to forward the data packet via at least one of the ring interfaces to at least one second node among three or more of the nodes in the ring network that are associated with the VPLS;

wherein the data packet received via the one of the ports comprises a destination address outside the ring network, and wherein the processing circuitry is adapted to check the destination address and the VPLS ID against a forwarding table held at the first node to determine the at least one second node on the ring network to which the data packet should be forwarded;

wherein a subset of the nodes of the ring network is assigned to serve the VPLS;

wherein the processing circuitry is adapted to multicast the data packet to the subset of the nodes if the forwarding table does not include an entry corresponding to the destination address and the VPLS ID;

wherein the processing circuitry is adapted to set a time-to-live (TTL) value of the data packet so that the data packet will reach all the nodes in the subset without traversing at least one span of the ring network; and wherein the TTL value is set equal to a minimal number of hops required to reach all the nodes in the subset serving the VPLS.

45. The apparatus according to claim 44, wherein the data packet comprises a pseudo-wire (PW) label, and wherein the PW label comprises the VPLS ID.

46. The apparatus according to claim 45, wherein the ring network is configured to support a point-to-point tunneling service, and wherein the processing circuitry is adapted to set a flag in the PW label indicating whether the data packet is associated with the VPLS or with the point-to-point service.

47. The apparatus according to claim 44, wherein the processing circuitry is adapted to receive the data packet in a first packet format, and to convert the data packet to a second packet format that is compliant with a ring network protocol and includes the VPLS ID.

48. The apparatus according to claim 47, wherein the ring network protocol comprises a resilient packet ring (RPR) protocol, and wherein the processing circuitry is adapted to insert the VPLS ID in a RPR destination address of the data packet.

49. The apparatus according to claim 48, wherein the RPR destination address comprises a multicast destination address, which is determined responsively to the data packet received over the link.

50. The apparatus according to claim 47, wherein the processing circuitry is adapted to read a destination address of the data packet, and to check the destination address and the VPLS ID against a forwarding table held at the first node, and to determine the at least one second node to which the data packet should be forwarded based on the forwarding table.

51. The apparatus according to claim 50, wherein the processing circuitry is adapted to multicast the data packet to a subset of the nodes of the ring network that are assigned to serve the VPLS if the forwarding table does not contain an entry corresponding to the destination address and the VPLS ID.

52. The apparatus according to claim 47, wherein the received data packet in the first packet format comprises a first VPLS identifier that identifies the VPLS on a link that is coupled to the one of the ports, and wherein the processing circuitry is adapted to map the first VPLS identifier to a second VPLS identifier, and to insert the second VPLS identifier in the data packet in the second packet format.

53. The apparatus according to claim 52, wherein the VPLS is configured to operate on first and second ring networks, which are connected by the link therebetween.

54. The apparatus according to claim 44, wherein the processing circuitry is adapted to read from the forwarding table a direction in which to forward the data packet around the ring to the at least one second node, and to select at least one of the ring interfaces through which to forward the data packet so as to transmit the data packet around the ring in the direction.

55. The apparatus according to claim 54, wherein the processing circuitry is adapted to identify one of the nodes in the ring network that serves the destination address, and to compute a number of hops required to reach the one of the nodes, and to set a time-to-live (TTL) value of the data packet to the computed number.

56. The apparatus according to claim 44, wherein the VPLS comprises at least first and second VPLS instances that are operative on the ring network, and wherein the processing circuitry is adapted to make a determination that the data packet is associated with the first instance, and to select the at least one second node responsively to the determination.

57. The apparatus according to claim 56, wherein first and second subsets of the nodes of the ring network are assigned to serve, respectively, the first and second instances, and wherein the processing circuitry is adapted to select the at least one second node from among the nodes in the first subset.

58. Apparatus for communication via a ring network, the apparatus comprising a plurality of nodes associated with a Virtual Private LAN Service (VPLS), linked together in a ring by spans of the ring network, wherein first and second subsets of the nodes of the ring network are assigned to serve, respectively, first and second instances of a VPLS, at least one of the first and second subsets comprising three or more of the nodes in the ring network,
wherein the nodes are adapted to receive an assignment of respective first and second VPLS identifiers (VPLS IDs) to the first and second instances, wherein each of the VPLS IDs has the same respective value for both unicast and multicast packets in the respective VPLS instance across all the nodes of the ring network,
wherein the nodes are adapted, upon receiving a data packet that comprises a virtual LAN identifier, to map the virtual LAN identifier into one of the VPLS IDs and to replace the virtual LAN identifier therewith, to forward the data packet selectively, responsively to the first or second VPLS ID, to one or more additional nodes in one of the first and second subsets, wherein the virtual LAN identifier is one of: a VLAN ID and a port identifier;
wherein the nodes in each of the first and second subsets are adapted to multicast the data packet only to the nodes in the one of the first and second subsets, respectively; and
wherein the nodes in each of the first and second subsets are adapted to set a time-to-live (TTL) value of the data packet so that the data packet will reach all the nodes in the one of the first and second subsets, respectively, without traversing at least one span of the ring network.

59. The apparatus according to claim 58, wherein the at least one of the nodes belongs to both the first and second subsets.

60. The apparatus according to claim 58, wherein the nodes in each of the first and second subsets are adapted to unicast the data packet to at least one of the nodes in the one of the first and second subsets, respectively.

61. The apparatus according to claim 60, wherein nodes in each of the first and second subsets are adapted to set a time-to-live (TTL) value of the data packet so that the data packet will reach the at least one of the nodes in the one of the first and second subsets without traversing at least one span of the ring network.

62. The apparatus according to claim 58, wherein the data packet comprises a pseudo-wire (PW) label, and wherein the PW label comprises the first VPLS ID, wherein the first and second instances are assigned different, respective first and second label values.

63. The apparatus according to claim 58, wherein the ring network operates in accordance with a resilient packet ring (RPR) protocol, and wherein the data packet comprises a RPR destination address, which comprises the first VPLS ID.

64. The apparatus according to claim 58 wherein each of the nodes comprises a media access control (MAC) processor, which is adapted to filter data packets received via the spans of the ring network responsively to the identification of the first and second instances of the VPLS.

65. The apparatus according to claim 58, wherein at least one of the nodes comprises a bridge node, which is coupled to receive the data packet over a link from a source node outside the ring network, the data packet comprising a destination address outside the ring network, and wherein the bridge node is adapted to read a destination address of the data packet, and to check the destination address and the first or second VPLS ID to determine a forwarding table held at the first node, and determining the one or more additional nodes to which the data packet should be forwarded based on the forwarding table.

66. The apparatus according to claim 65, wherein the bridge node is adapted to multicast the data packet to the nodes of the ring network that are in one of the first subsets if the forwarding table does not contain an entry corresponding to the destination address and the first or second VPLS ID.

67. The apparatus according to claim 65, wherein the bridge node is adapted to read from the forwarding table a direction in which to forward the data packet around the ring to at least one of the one or more additional nodes, and to transmit the data packet around the ring in the direction.

68. The apparatus according to claim 65, wherein the bridge node is adapted to receive the data packet over the link from outside the ring network in a link packet format, wherein the received data packet comprises an external VPLS identifier that identifies the first instance of the VPLS on the link, and wherein the bridge node is adapted to map the external VPLS identifier to the first VPLS ID, and to format the data packet for transmission over the ring network in a ring packet format, and to insert the first VPLS ID in the data packet.

69. Apparatus for communication via a ring network that includes a plurality of nodes associated with a Virtual Private LAN Service (VPLS), a subset of which, comprising three or more of the nodes, are assigned to serve a VPLS, the apparatus comprising:
first and second ring interfaces, which are adapted to couple a first node to respective first and second spans of the ring network;
a bridge, comprising one or more ports for coupling the first node to one or more user nodes outside the ring network; and
processing circuitry, which is adapted to accept an assignment of a VPLS identifier (VPLS ID) to the VPLS, wherein the VPLS ID has the same value for both unicast and multicast packets in the VPLS across all the nodes of the ring network, and which is adapted to receive via one of the ports a data packet transmitted from a source node and containing a virtual LAN identifier which is one of: a VLAN ID and a port identifier, the data packet comprising a destination address outside the ring network, to map the virtual LAN identifier into the VPLS ID to replace the virtual LAN identifier of the data packet with the VPLS ID, to check the destination address and the VPLS ID against a forwarding table to locate a destination node on the ring network to which the data packet should be forwarded, and to multicast the data packet to the subset of the nodes if the forwarding table does not indicate the destination node corresponding to the destination address of the data packet;
wherein the processing circuitry is adapted, upon finding an entry in the forwarding table indicating the destination node in the subset of the nodes of the ring network that corresponds to the destination address of the data packet, to unicast the data packet to the destination node for forwarding over the VPLS to the destination node;
wherein the entry further indicates a direction of transmission on the ring network from the bridge to the destination node, and wherein the processing circuitry is adapted to transmit the data packet via one of the first and second ring interfaces in the indicated direction; and
wherein the processing circuitry is adapted to learn the direction of transmission responsively to one or more previous packets received from the ring network at the first node.

70. The apparatus according to claim 69, wherein the direction of transmission comprises a shortest path between the first node and the destination node.

71. The apparatus according to claim 69, wherein the processing circuitry is adapted to discover a faulty span in the ring network, and to change the direction of transmission indicated in the table so as to steer the data packet to the destination node while avoiding the faulty span.

72. The apparatus according to claim 69, wherein the ring network operates in accordance with a resilient packet ring (RPR) protocol, and wherein the processing circuitry is adapted to insert in a header of the packet a multicast RPR destination address corresponding to the VPLS.

73. The apparatus according to claim 72, wherein the multicast RPR destination address comprises a private multicast address, which comprises the VPLS ID, so that the multicast data packet is not copied by the nodes of the ring network that are outside the subset.

74. The apparatus according to claim 69, wherein the ring network operates in accordance with a resilient packet ring (RPR) protocol, and wherein the processing circuitry is adapted to insert in a header of the packet a unicast RPR destination address corresponding to the VPLS.

75. The apparatus according to claim 69, wherein the processing circuitry is adapted to set a time-to-live (TTL) value of the data packet so that the data packet will reach all the nodes in the subset without traversing at least one span of the ring network.

76. The apparatus according to claim 69, wherein the VPLS comprises at least first and second VPLS instances that are operative on the ring network, and wherein first and second subsets of the nodes are assigned, respectively, to serve the first and second instances.

77. The apparatus according to claim 69, wherein the bridge is coupled to a link from outside the ring network, and wherein the processing circuitry is adapted to receive the data packet from the link in a link packet format, wherein the received data packet comprises an external VPLS identifier that identifies the VPLS on the link, and
wherein the processing circuitry is adapted to map the external VPLS identifier to the VPLS ID, and to format the data packet for transmission over the ring network in a ring packet format, and to insert the VPLS ID in the data packet.

78. Apparatus for communication via a bi-directional ring network that includes a plurality of nodes and spans interconnecting the nodes associated with a Virtual Private LAN Service (VPLS), wherein a subset of the nodes are assigned to serve a VPLS, such that two of the nodes in the subset are separated from one another by at least two adjacent spans of the network, the apparatus comprising:
first and second ring interfaces, which are adapted to couple a first node to respective first and second spans of the ring network;
a bridge, comprising one or more ports for coupling the first node to one or more user nodes outside the ring network; and
processing circuitry, which is adapted to receive via one of the ports a data packet having a virtual LAN identifier which is one of: a VLAN ID and a port identifier, to map the virtual LAN identifier into a VPLS identifier (VPLS ID) and replace the virtual LAN identifier with the VPLS ID in the data packet for transmission over the VPLS, to determine a respective maximal number of the spans that must be traversed by the data packet in each direction around the ring network in order to reach all the nodes in the subset from the first node, and to multicast the data packet from the first node to the nodes in the subset in both directions around the ring network, while setting a time-to-live (TTL) value of the data packet responsively to the respective maximal number so that the data packet does not traverse the at least two adjacent spans in either direction in the ring network;
wherein the processing circuitry is adapted to transmit first and second copies of the data packet via the first and second ring interfaces in respective, mutually-opposing first and second directions around the ring network;
wherein the processing circuitry is adapted to set first and second TTL values, respectively, in the first and second copies of the data packet so as to minimize the number of the spans that will be traversed by the data packet while reaching all the nodes in the subset; and
wherein the processing circuitry is adapted, upon occurrence of a fault in one of the spans of the network, to steer at least one of the first and second copies so as to avoid the fault, and to adjust at least one of the TTL values responsively to the steering.

79. The apparatus according to claim 78, wherein the ring network operates in accordance with a resilient packet ring (RPR) protocol, and wherein the processing circuitry is adapted to apply to the data packet a private multicast RPR destination address, which identities the subset.

80. The apparatus according to claim 78, wherein the VPLS comprises at least first and second VPLS instances that are operative on the ring network, wherein first and second subsets of the nodes are assigned, respectively, to serve the first and second instances, and wherein the processing circuitry is adapted to read from the data packet a VPLS identifier indicating whether the packet belongs to the first or the second instance, and to select one of the first and second subsets to which the data packet is to be multicast responsively to the VPLS identifier.

81. Apparatus for communication, comprising:
a plurality of nodes that are interconnected in a predefined topology, wherein a subset of the nodes are assigned to serve a virtual private LAN service (VMS), the subset defining a VPLS topology within the predefined topology; and
a connection admission controller (CAC), associated with at least one of the nodes, which is adapted to receive a request to admit a new connection on the VPLS, to assess availability of bandwidth to serve the new connection based on the VPLS topology, and to determine whether to admit the new connection responsively to the availability of the bandwidth,
wherein the predefined topology comprises a ring, in which the nodes are interconnected by spans of the ring, and wherein the CAC is adapted to assess an upstream bandwidth required by the new connection on the spans of the ring and to assess a downstream bandwidth required by the new connection via the nodes in the subset to destinations outside the ring, and
wherein the CAC is adapted to assess the downstream bandwidth by summing bandwidth requirements of all connections served by each of the nodes in the subset, and verifying that each of the nodes in the subset has sufficient bandwidth available to serve the new connection, and
wherein at least one of the nodes in the subset is assigned to serve a first instance of the VPLS, but not a second instance of the VPLS, and wherein the CAC is adapted, for the at least one of the nodes, to sum the bandwidth requirements of the connections on the first instance of the VPLS, but not the connections on the second instance of the VPLS.

* * * * *